US012169814B2

(12) United States Patent
Povsner et al.

(10) Patent No.: US 12,169,814 B2
(45) Date of Patent: Dec. 17, 2024

(54) BLOCKCHAIN-BASED TRANSACTION MECHANISMS

(71) Applicant: NATIONAL CURRENCY TECHNOLOGIES, INC., Ashburn, VA (US)

(72) Inventors: Joshua Mitchell Povsner, Ashburn, VA (US); Christopher Michael Carthy, Carmel, CA (US); John Ellis Stafira, Dallas, TX (US)

(73) Assignee: NATIONAL CURRENCY TECHNOLOGIES, INC., Ashburn, VA (US)

( * ) Notice: Subject to any disclaimer, the term of this patent is extended or adjusted under 35 U.S.C. 154(b) by 16 days.

(21) Appl. No.: 18/203,120

(22) Filed: May 30, 2023

(65) Prior Publication Data

US 2023/0297977 A1 Sep. 21, 2023

Related U.S. Application Data

(63) Continuation of application No. 17/154,331, filed on Jan. 21, 2021, now Pat. No. 11,741,439.

(60) Provisional application No. 62/963,907, filed on Jan. 21, 2020.

(51) Int. Cl.
| | |
|---|---|
| *G06Q 20/00* | (2012.01) |
| *G06Q 20/06* | (2012.01) |
| *H04L 9/06* | (2006.01) |
| *G06Q 20/36* | (2012.01) |
| *H04L 9/00* | (2022.01) |

(52) U.S. Cl.
CPC ......... *G06Q 20/065* (2013.01); *H04L 9/0618* (2013.01); *G06Q 20/36* (2013.01); *H04L 9/50* (2022.05); *H04L 2209/56* (2013.01)

(58) Field of Classification Search
CPC .... G06Q 20/065; G06Q 20/36; H04L 9/0618; H04L 9/50; H04L 2209/56
USPC ....................................................... 235/379
See application file for complete search history.

(56) References Cited

U.S. PATENT DOCUMENTS

| | | | |
|---|---|---|---|
| 11,741,439 B2 * | 8/2023 | Carthy | ............... H04L 9/3239 |
| | | | 235/379 |
| 2014/0279551 A1 | 9/2014 | Samid | |
| 2019/0295159 A1 | 9/2019 | Samid | |
| 2020/0033834 A1 | 1/2020 | Samid | |

* cited by examiner

*Primary Examiner* — Daniel A Hess
(74) *Attorney, Agent, or Firm* — VOLENTINE, WHITT & FRANCOS, PLLC

(57) ABSTRACT

A method for dedicating a set of digital tokens of a single type includes obtaining a set of digital tokens of the single type from a pool of digital tokens of the single type that includes the set of digital tokens of the single type; and individually, separately and uniquely marking a record for each of the set of digital tokens of the single type with a first identifiable characteristic dedicated only to the set of digital tokens of the single type by adding data with the first identifiable characteristic and limited only to the set of digital tokens of the single type to the record for each of the set of digital tokens of the single type.

20 Claims, 20 Drawing Sheets

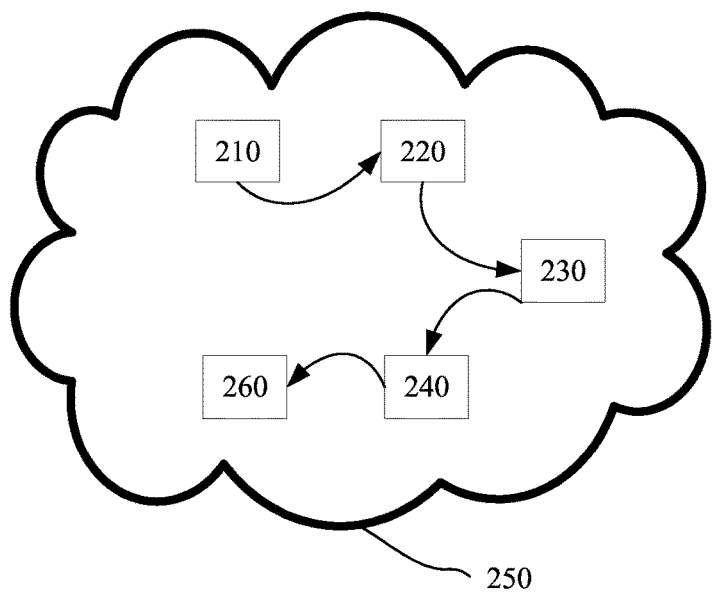
FIG. 2E
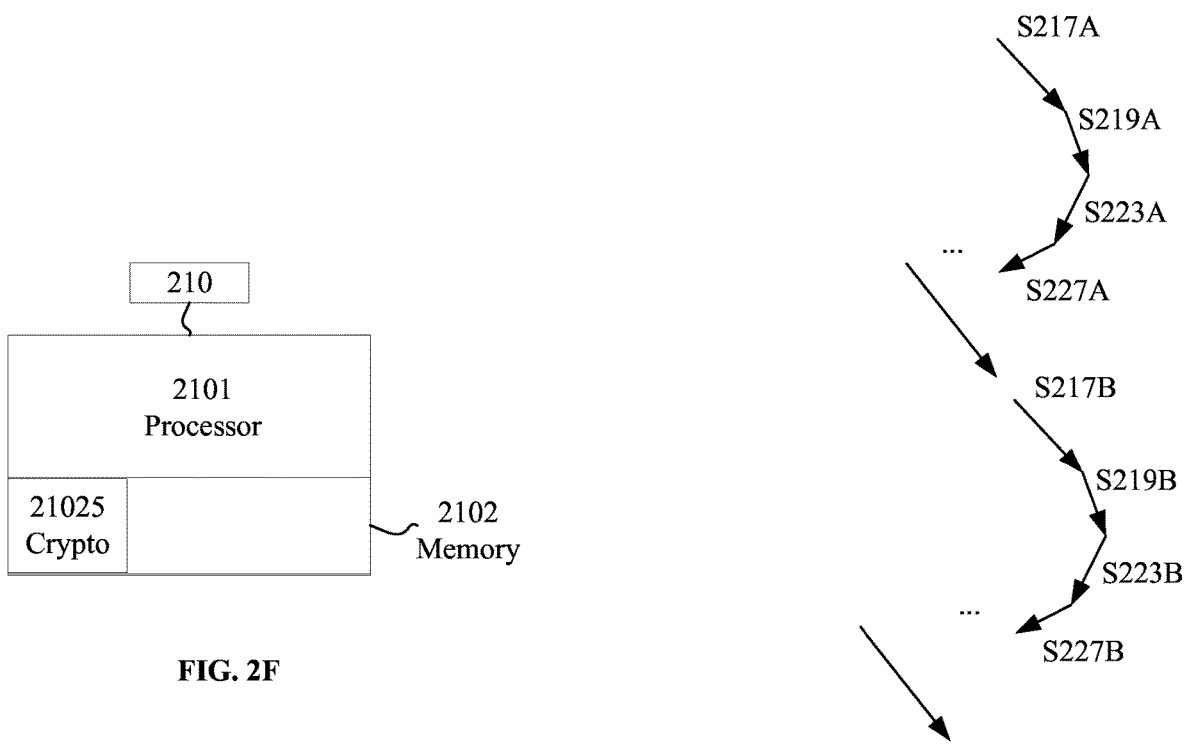
FIG. 2F
FIG. 2G

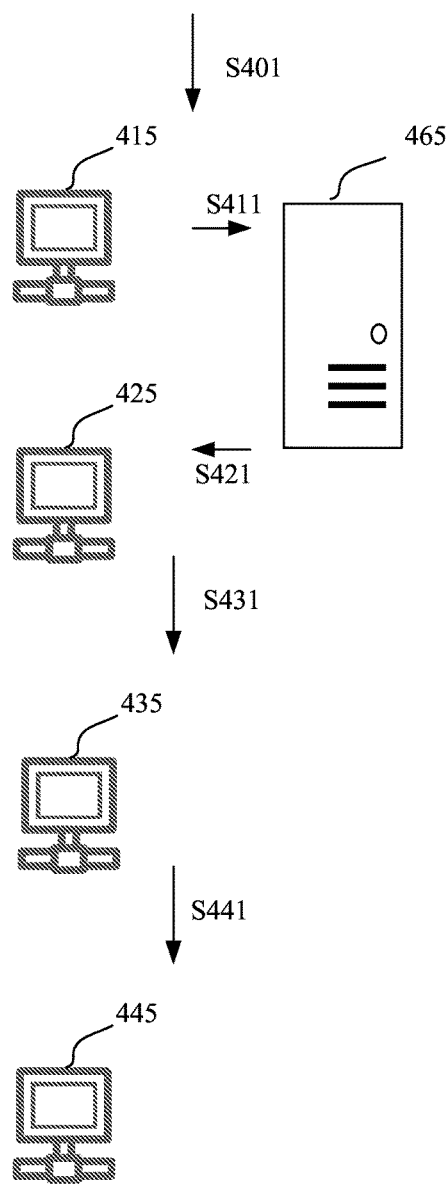
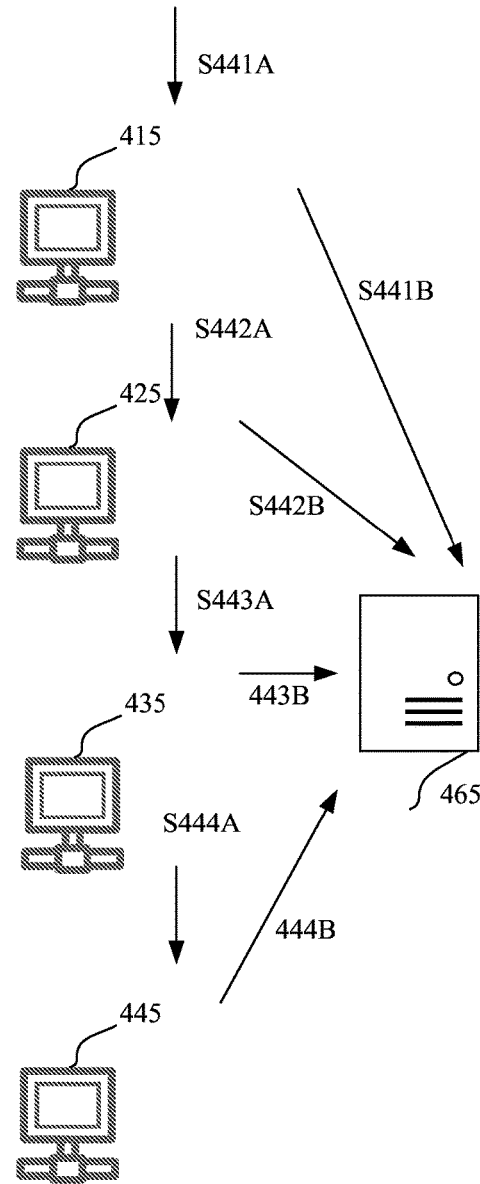
FIG. 4A
FIG. 4B

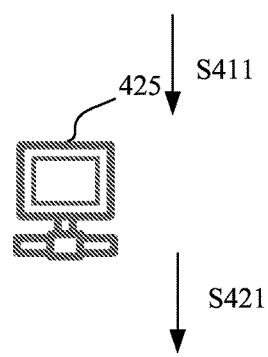
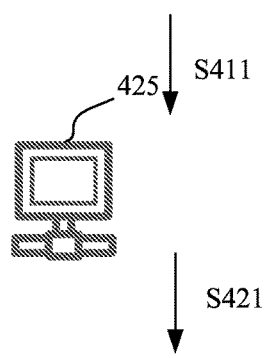
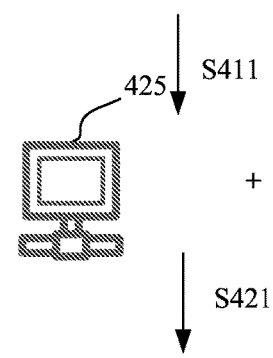
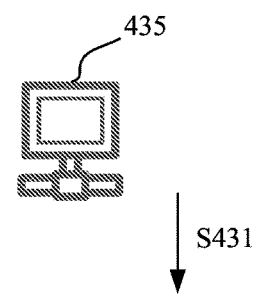
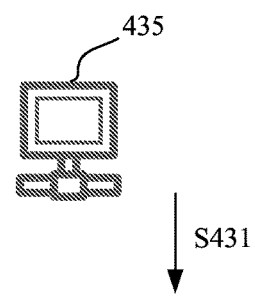
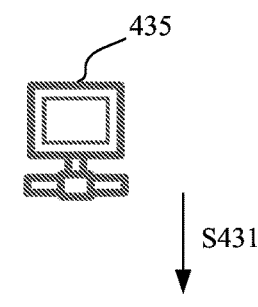
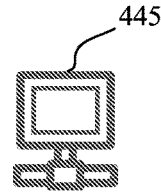
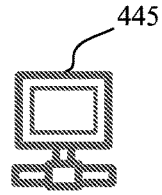
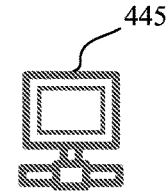
FIG. 4C  FIG. 4D  FIG. 4E

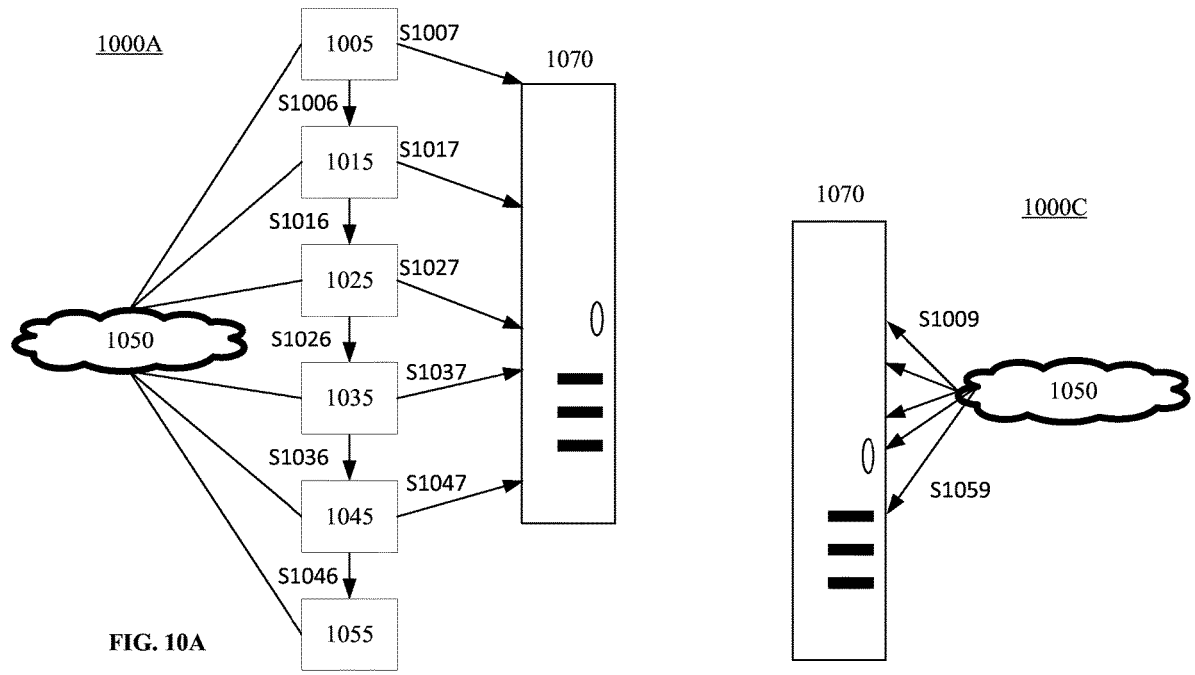
FIG. 10A
FIG. 10C
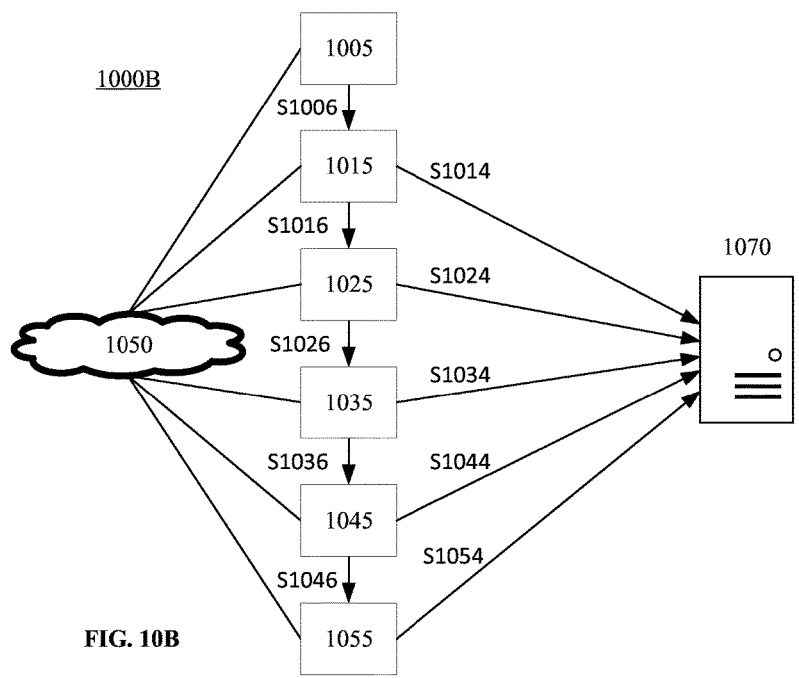
FIG. 10B

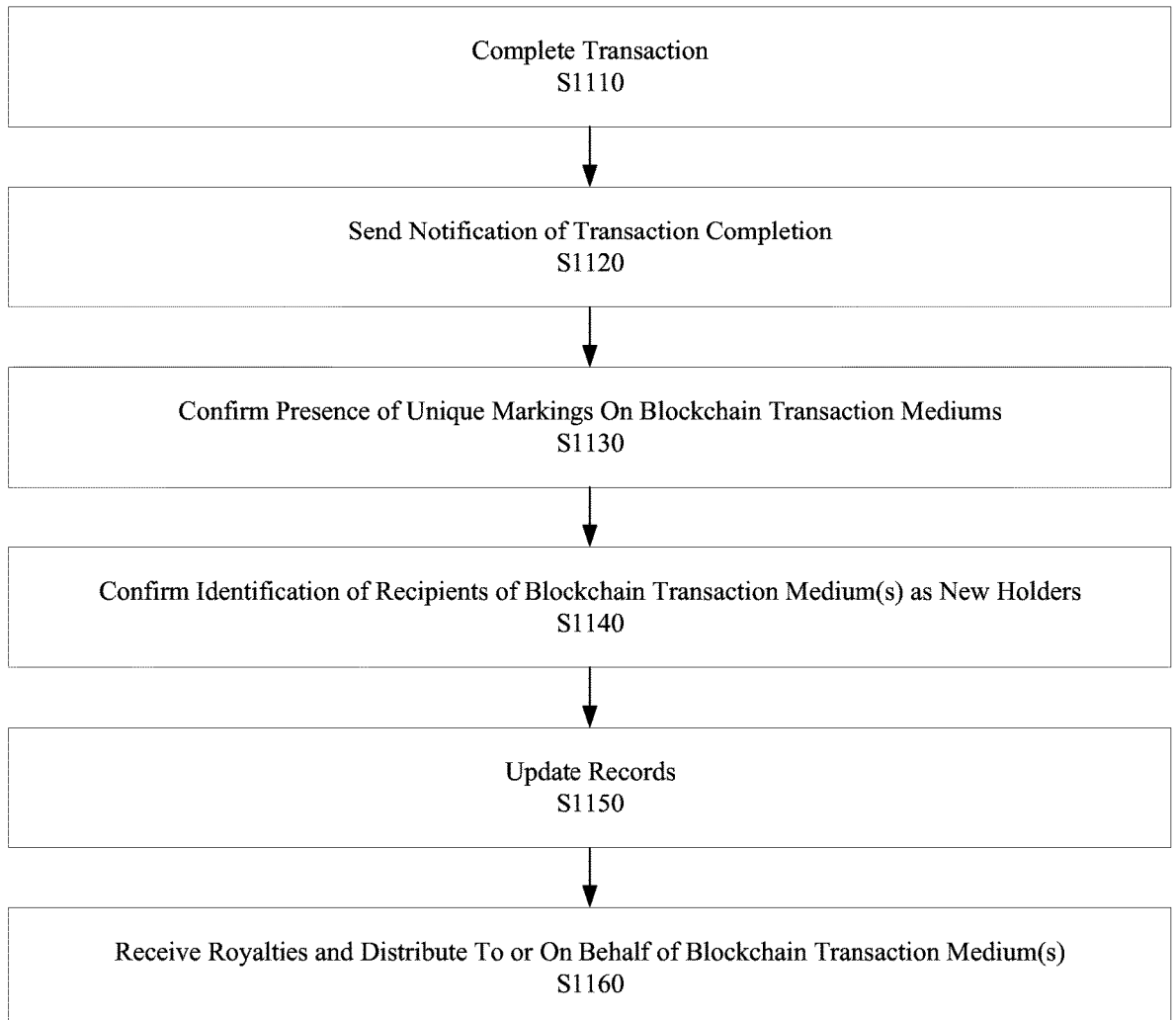

FIG. 12

| Blockchain Medium #1 | Nominal Value | X1 |
| | Default Market Value | Y1 |
| | Subclass Market Value | Z1 |
| Blockchain Medium #2 | Nominal Value | X2 |
| | Default Market Value | Y2 |
| | Subclass Market Value | Z2 |

2053
Display

FIG. 15

| Transactions | | | | | | |
|---|---|---|---|---|---|---|
| Transaction ID | TimeStamp | Sender | Recipient | Type | Pool Value | Set Value |
| #1 | Date/Time#1 | Address#1S | Address#1R | Medium#1 | Value#1P | Value#1S |
| #2 | Date/Time#2 | Address#2S | Address#2R | Medium#2 | Value#2P | Value#2S |

2053
Display

BLOCKCHAIN-BASED TRANSACTION MECHANISMS

CROSS-REFERENCE TO RELATED APPLICATION

This application is a continuation application of application Ser. No. 17/154,331 filed on Jan. 21, 2021, which claims the benefit of priority to Provisional U.S. Patent Application No. 62/963,907, filed on Jan. 21, 2020 in the United States Patent and Trademark Office, the contents of which are herein incorporated by reference in their entireties.

BACKGROUND

A blockchain is an evolving set of individual records built in linked blocks that are progressively added using cryptography as the blockchain evolves. Versions of the blockchain are maintained at each of multiple blockchain transaction nodes in a blockchain network so that a record of each individual transaction to be recorded in a next block to be added is distributed to each networked transaction node in the blockchain network. Each networked transaction node maintains a version of the blockchain and adds the transactions to the next block to be added to the blockchain before adding the block to the blockchain using cryptography when the next block is ready to be added. The versions of the blockchain maintained at the different blockchain transaction nodes are a form of distributed ledger. Each block of the blockchain may include records of multiple transactions. The blockchain is designed to be resistant to modification of the records of the transactions insofar as the versions of the blockchain are maintained at different blockchain transaction nodes, and by design the transactions are rendered resistant to repudiation.

Blockchain technology has rapidly evolved since the Bitcoin blockchain protocol was introduced in a paper published in October 2008 under the pseudonym Satoshi Nakamoto. Since 2008, numerous additional blockchain transaction protocols have been developed. A blockchain transaction protocol may define a electronic coin as a blockchain transaction medium that is the basic unit of currency for transactions recorded in a blockchain network. Under some blockchain transaction protocols, electronic tokens may be created as derivative blockchain transaction mediums that are based on one or more electronic coins.

FIG. 1A illustrates a known process for adding a transaction to a blockchain in a blockchain network. In FIG. 1A, a first user device 105 transacts a electronic coin or electronic token to a second user device 115 in a transaction at S101. At S102, the second user device 115 notifies a blockchain network 150 to add the transaction to the newest block 113 of the blockchain 199. The newest block 113 is added to the blockchain 199 based on the notification from S102. In alternative known processes, the first user device 105 may notify the blockchain network 150 of the transaction at S102, or both the first user device 105 and the second user device 115 may both notify the blockchain network 150 of the transaction at S102. In FIG. 1A, the blockchain network 150 may include multiple blockchain transaction nodes that each maintain a version of the blockchain 199.

FIG. 1B illustrates a known blockchain network for adding a transaction to a blockchain in FIG. 1A. In FIG. 1B, the blockchain network 150 includes five blockchain transaction nodes including a first blockchain transaction node 110, a second blockchain transaction node 120, a third blockchain transaction node 130, a fourth blockchain transaction node 140, and a fifth blockchain transaction node 160. In FIG. 1B, the five blockchain transaction nodes in the blockchain network 150 distribute records of transactions so that the versions of the blockchain 199 maintained by each blockchain transaction node are updated to include each transaction. At S103, the first blockchain transaction node 110 adds the transaction to the newest block 113 of the version of the blockchain 199 maintained by the first blockchain transaction node 110. At S104, the first blockchain transaction node 110 notifies the second blockchain transaction node 120 to add the transaction to the newest block 113 of the version of the blockchain 199 maintained by the second blockchain transaction node 120. At S106, the second blockchain transaction node 120 adds the transaction to the newest block 113 of the version of the blockchain 199 maintained by the second blockchain transaction node 120. At S107, the second blockchain transaction node 120 notifies the third blockchain transaction node 130 to add the newest block 113 of the version of the blockchain 199 maintained by the third blockchain transaction node 130. At S108, the third blockchain transaction node 130 adds the transaction to the newest block 113 of the version of the blockchain 199 maintained by the third blockchain transaction node 130. At S109, the third blockchain transaction node 130 notifies the fourth blockchain transaction node 140 to add the newest block 113 of the version of the blockchain 199 maintained by the fourth blockchain transaction node 140. At S111, the fourth blockchain transaction node 140 adds the transaction to the newest block 113 of the version of the blockchain 199 maintained by the fourth blockchain transaction node 140. At S112, the fourth blockchain transaction node 140 notifies the fifth blockchain transaction node 160 to add the newest block 113 of the version of the blockchain 199 maintained by the fifth blockchain transaction node 160. At S114, the fifth blockchain transaction node 160 adds the transaction to the newest block 113 of the version of the blockchain 199 maintained by the fifth blockchain transaction node 160.

Blockchain-based transaction mechanisms have not yet been fully developed, and some types of existing business practices such as the use of securities have not been fully adapted to blockchain. For example, attempts to adapt blockchain to existing business practices are often tied to development of a specific blockchain protocol. However, mechanisms for uniquely creating sets of blockchain transaction mediums such as from a pool of existing blockchain transaction mediums, tracking ownership of the sets of blockchain transaction mediums, and providing income streams to owners of the sets of blockchain transaction mediums, have not been fully developed.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 2E illustrates a blockchain network in the transaction network for blockchain-based transaction mechanisms in FIG. 2A and the transaction network for blockchain-based transaction mechanisms in FIG. 2B, in accordance with a representative embodiment.

FIG. 2F illustrates a blockchain transaction node in the blockchain network in the transaction network in FIG. 2E, in accordance with a representative embodiment.

FIG. 2G illustrates another transaction flow for blockchain transaction mediums using the transaction network for blockchain-based transaction mechanisms of FIG. 2B, in accordance with a representative embodiment.

FIG. 4A illustrates a process flow for blockchain-based transaction mechanisms, in accordance with another representative embodiment.

FIG. 4B illustrates another process flow for blockchain-based transaction mechanisms, in accordance with another representative embodiment.

FIG. 4C illustrates another process flow for blockchain-based transaction mechanisms, in accordance with another representative embodiment.

FIG. 4D illustrates another process flow for blockchain-based transaction mechanisms, in accordance with another representative embodiment.

FIG. 4E illustrates another process flow for blockchain-based transaction mechanisms, in accordance with another representative embodiment.

FIG. 10A illustrates an arrangement for transaction reporting for blockchain-based transaction mechanisms, in accordance with a representative embodiment.

FIG. 10B illustrates another arrangement for transaction reporting for blockchain-based transaction mechanisms, in accordance with a representative embodiment.

FIG. 10C illustrates another arrangement for transaction reporting for blockchain-based transaction mechanisms, in accordance with a representative embodiment.

FIG. 11 illustrates a method for tracking blockchain-based transaction mechanisms, in accordance with a representative embodiment.

FIG. 12 illustrates a wallet user interface for blockchain-based transaction mechanisms, in accordance with a representative embodiment.

FIG. 15 illustrates a wallet user interface displaying transaction records for blockchain-based transaction mechanisms, in accordance with a representative embodiment.

DETAILED DESCRIPTION

Figure 1A:
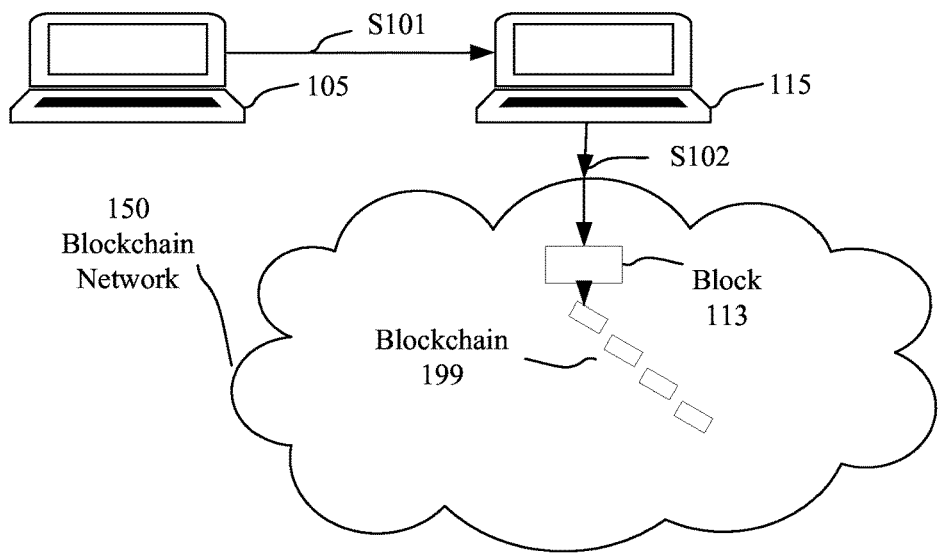
FIG. 1A illustrates a known process for adding a transaction to a blockchain in a blockchain network.
Figure 1B:
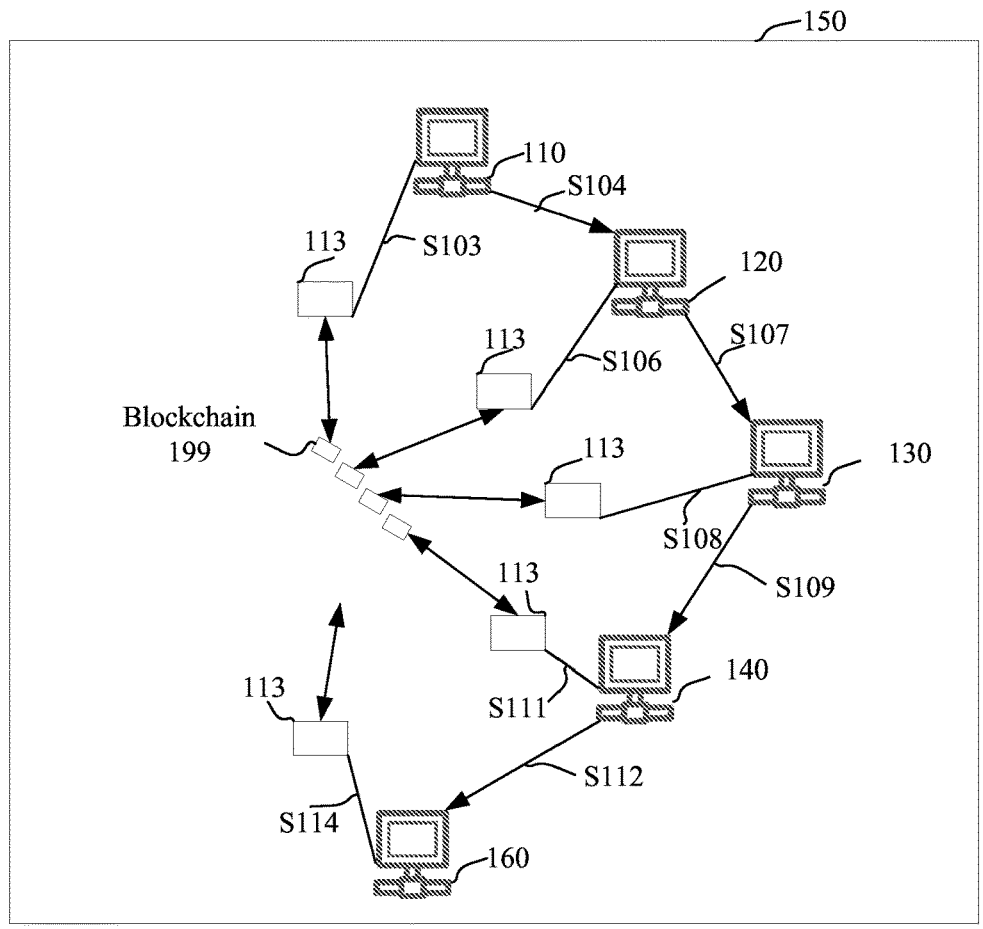
FIG. 1B illustrates a known blockchain network for adding a transaction to a blockchain in FIG. 1A.

In the following detailed description, for the purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

As described herein, blockchain transaction mediums may be dedicated for a singular use or type of use, whether the blockchain transaction mediums are originally created for such a singular use or type of use or whether the blockchain transaction mediums are modified or otherwise adapted from existing blockchain transaction mediums that are already in use for the singular use or type of use. In the descriptions herein, the singular use or type of use is primarily described as electronically transactable proof of ownership of a security such as a royalty-based security that defines rights to royalty payments. The blockchain transaction mediums may be distributed to individuals committed to a common task or purpose as a common commitment in a manner that makes the blockchain transaction mediums isolated and isolatable from similar blockchain transaction mediums in a larger general pool of blockchain transaction mediums.

In the descriptions below, several terms are used repeatedly and should be interpreted consistently. Accordingly, for the purposes of the present description, exemplary explanations are provided for the several terms as follows:

Blockchain—As the term is used herein, "blockchain" may mean a distributed set of records which are separately maintained at each of multiple blockchain network nodes so that any particular record in the set can be confirmed by consensus among the multiple blockchain network nodes.

Block—As the term is used herein, a "block" may mean a subset of a blockchain which is added once enough new records are accumulated to meet the definition of a block according to the relevant blockchain protocol.

Blockchain transaction medium—As the term is used herein, a "blockchain transaction medium" may mean either a electronic coin or a electronic token derived from one or more electronic coins.

Dedicate/dedicating—As the terms are used herein, "dedicate" and "dedicating" may mean putting a blockchain transaction medium to use for a particular purpose distinguishable from other purposes for which the blockchain transaction medium may be put to use.

Coin—As the term is used herein, a "coin" may mean the fundamental unit of currency for transactions according to the relevant blockchain protocol.

Token—As the term is used herein, a "token" may mean a derivative of a coin defined according to the relevant blockchain protocol.

Transacting—As the term is used herein, "transacting" may mean engaging in a transaction between two entities, typically using two communications devices connected over an electronic network.

Unique Marking—As the term is used herein, a "unique marking" may mean a unique characteristic provided in, on, to or for a blockchain transaction medium that uniquely marks the blockchain transaction medium as belonging to a dedicated set of blockchain transaction mediums.

Identifiable Characteristic—As the term is used herein, an "identifiable characteristic" may mean a characteristic added in, on, to or for a blockchain transaction medium that can be used to readily identify the blockchain transaction medium in a way that uniquely identifies the blockchain transaction medium as belonging to a dedicated set of blockchain transaction mediums.

Contributor node—As the term is used herein, a "contributor node" may mean a grouping of individuals at and/or for an organization, committed to the same purpose in common and entitled to returns generated from fulfilling the purpose.

Networked transaction node—As the term is used herein, a "networked transaction node" may mean a system controlled by a specific individual, connected to other similar systems over an electronic network, and configured to perform or enable performance of transactions with the other similar systems.

Figure 2A:
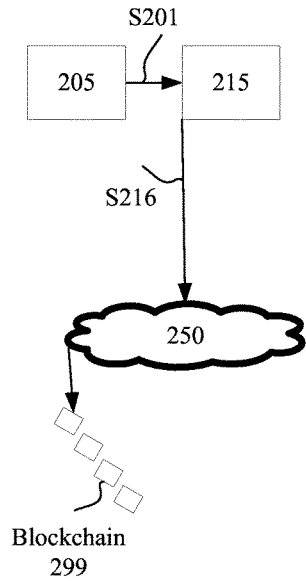
FIG. 2A illustrates a transaction network for blockchain-based transaction mechanisms, in accordance with a representative embodiment.

FIG. 2A illustrates a transaction network for blockchain-based transaction mechanisms, in accordance with a representative embodiment.

In FIG. 2A, the transaction network 200 includes a blockchain network 250 and a set of user devices including a first user device 205 and a second user device 215. The set of user devices in FIG. 2A may communicate over electronic communications networks such as the internet. Additionally, the set of user devices in FIG. 2A may communicate with blockchain transaction nodes in the blockchain network 250. The blockchain transaction nodes in the blockchain network 250 may also communicate over the one or more electronic communications networks such as the internet. Electronic communications networks by which the set of user devices and the blockchain transaction nodes in the blockchain network 250 in FIG. 2A communicate may be wired or wireless.

The transaction network 200 in FIG. 2A may be coordinated as a whole to perform functions described herein. For example, the first user device 205 and the second user device 215 may be individually programmed to perform coordinated functionality described herein. Additionally or alternatively, as shown in and described with respect to FIG. 9, a central controller such as the central controller 995 in FIG. 9 (e.g., a server) may coordinate the functionality of the set of user devices in FIG. 2A. While the transaction network 200 is shown with a set of two user devices, a set of user devices in the transaction network 200 in FIG. 2A may include more than two user devices. For example, transactions between hundreds of user devices in the transaction network 200 may be coordinated in the manner described herein.

Figure 2B:
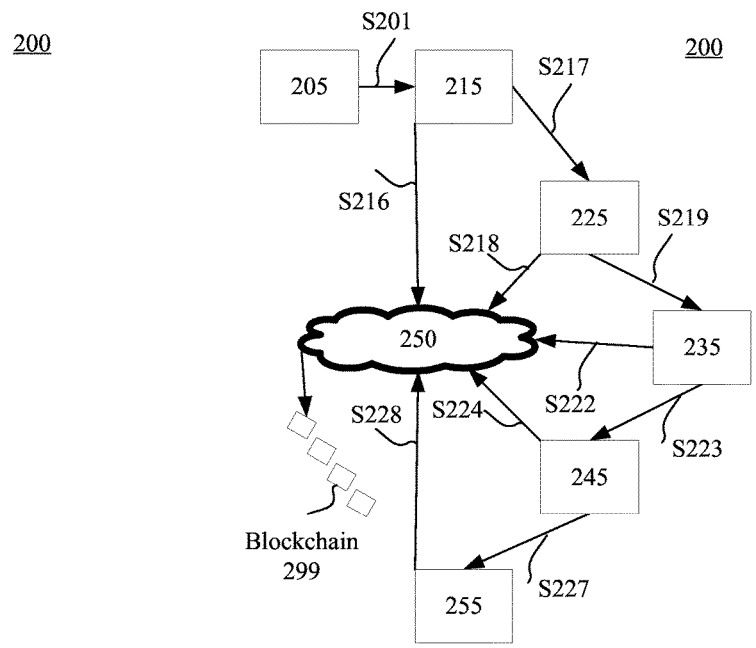
FIG. 2B illustrates another transaction network for blockchain-based transaction mechanisms, in accordance with a representative embodiment.
Figure 2C:
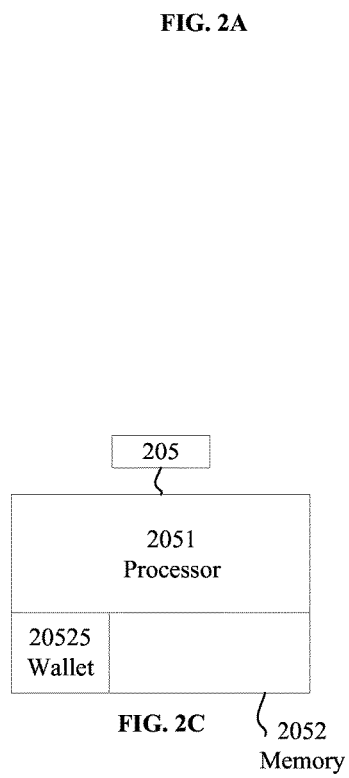
FIG. 2C illustrates a user device in a transaction network for blockchain-based transaction mechanisms, in accordance with a representative embodiment.

Each of the set of user devices in FIG. 2A may include a memory that stores instructions and a processor that executes the instructions as shown in and described with respect to the first user device 205 detailed in FIG. 2C. Additionally, each of the set of user devices in FIG. 2A may include some or all of the additional elements of a computer system 300 as shown in and described with respect to FIG. 3. Examples of the set of user devices in FIG. 2A include smartphones, tablet computers, laptop computers, desktop computers, or other types of electronic devices configured to execute instructions and communicate over electronic communications networks. The set of user devices in FIG. 2A may conduct transactions and generate transaction records that are then provided to the blockchain transaction nodes in the blockchain network 250 for inclusion in the next block of the versions of the blockchain 299 maintained by each blockchain transaction node. Alternatively, the set of user devices in FIG. 2A may generate transaction information used by the blockchain transaction nodes in the blockchain network 250 to generate transaction records for inclusion in the next block of the versions of the blockchain 299 maintained by each blockchain transaction node.

Networked transaction nodes described herein may each include one of the set of user devices in FIG. 2A. For example, a first networked transaction node may include the first user device 205 and affiliated devices connected to the first user device 205 such as a monitor and/or a printer. A second networked transaction node may include the second user device 215 and affiliated devices connected to the second user device 215.

Each of the blockchain transaction nodes in the blockchain network 250 in FIG. 2A (and FIG. 2B described below) may include a memory that stores instructions and a processor that executes the instructions as shown in and described with respect to the first blockchain transaction node 210 detailed in FIG. 2F. Additionally, each of the blockchain transaction nodes in the blockchain network 250 in FIG. 2A (and FIG. 2B) may include some or all of the additional elements of a computer system 300 as shown in and described with respect to FIG. 3. Examples of the blockchain transaction nodes include servers, desktop computers, or other types of electronic devices configured to execute instructions and communicate over electronic communications networks. The blockchain transaction nodes may be expected to be contactable most or all of the time given the potential to receive transaction information and/or transaction records from a set of user devices at any time. Blockchain transaction nodes may be virtualized, and therefore implemented by distributed functionality provided by multiple computers (e.g., servers) in the cloud, such as at one or more data centers. The blockchain transaction nodes in the blockchain network 250 in FIG. 2A (and FIG. 2B) may receive transaction records from the set of user devices for inclusion in the next block of the version of the blockchain 299 maintained by each blockchain transaction node. Alternatively, the blockchain transaction nodes in the blockchain network 250 in FIG. 2A (and FIG. 2B) may receive transaction information from the set of user devices and generate transaction records based on the received transaction information for inclusion in the next block of the version of the blockchain 299 maintained by each blockchain transaction node. Accordingly, the transaction records recorded in the versions of the blockchain 299 may be recorded as-is by the blockchain transaction nodes based on transaction records received from the set of user devices or may be generated based on adding to or modifying transaction information received by the blockchain transaction nodes from the set of user devices. Additionally, the blockchain transaction nodes may distribute the transaction information and/or transaction records to other blockchain transaction nodes until all of the blockchain transaction nodes in the blockchain network 250 that maintain versions of the blockchain 299 are notified of a transaction.

Additionally, the set of user devices in FIG. 2A (and FIG. 2B) are primarily described as being separate from blockchain transaction nodes in the blockchain network 250. However, in some embodiments, one or more of the set of user devices in FIG. 2A (and FIG. 2B) may also serve as a blockchain transaction node in the blockchain network 250.

Transactions among the set of user devices in FIG. 2A (and FIG. 2B) may include exchanges of a blockchain transaction medium for rights to something else such as a defined amount of a(nother) currency, a physical object, a service, or another transactable item. The transactions may be conducted between wallets (e.g., wallet applications) installed on each of the set of user devices in FIG. 2A (and FIG. 2B), and may be conducted via an electronic exchange provided, for example, by or for the entity that provides the electronic wallets. An electronic exchange is not shown in FIG. 2A (or FIG. 2B) but may separately record details of each transaction between wallets installed on each of the set of user devices in FIG. 2A (and FIG. 2B). The set of user devices in FIG. 2A (and FIG. 2B) may report the transactions to the blockchain transaction nodes in the blockchain network 250.

Blockchain transaction mediums described herein may include singular units of electronic currencies, as well as electronic tokens that are derived based on one or more units of electronic currencies. The blockchain transaction mediums may be cryptocurrency such as electronic coins that meet a standard or protocol set for the blockchain network 250 or may be electronic tokens derived from such a cryptocurrency.

The blockchain transaction mediums may be uniquely marked with one or more identifiable characteristic that can be confirmed later as unique markings that mark a set of blockchain transaction mediums among a larger pool of blockchain transaction mediums. For example, different unique markings may be provided for each of two or more entirely different sets of blockchain transaction mediums. The unique markings may be provided in, on, or for the blockchain transaction mediums, indicating that the blockchain transaction mediums belong to a particular set of blockchain transaction mediums. The unique marking of the blockchain transaction mediums may be coordinated among the set of user devices in FIG. 2A (and FIG. 2B). The unique markings may uniquely distinguish the set of blockchain transaction mediums as a set from any and all other blockchain transaction mediums of the same type or different types.

In FIG. 2A, the first user device 205 or the second user device 215 may generate the unique marking for each of a set of blockchain transaction mediums with a first identifiable characteristic. However, the unique marking may be generated by the combination of the first user device 205 and the second user device 215. For example, the unique marking may be one or more details of a record of the transaction between the first user device 205 and the second user device 215. The unique marking may include or be based on, for example, details of an identification of the first user device 205 and/or identification of the second user device 215, and/or the time and/or date of the transaction. The unique marking may also be a unique marking added to the blockchain transaction mediums, such as alphanumeric characters added to a header or field of a blockchain transaction medium.

In some embodiments described herein, the first identifiable characteristic may be based on an amount of time the blockchain transaction mediums are held at the first user device 205 and/or at the second user device 215. For example, the first identifiable characteristic may be for blockchain transaction mediums that are held by the first user device 205 for at least an hour, twenty four hours, a week, three weeks, a month, three months, or another amount of time. In this way, the combination of a computer identity and an amount of time present at the computer may be used to uniquely mark each of a set of blockchain transaction mediums. In some embodiments described herein, the combination of computer identities of both the first user device 205 and the second user device 215 and amounts of time present at each of the first user device 205 and the second user device 215 may uniquely mark the set of blockchain transaction mediums.

In some embodiment described herein, the first identifiable characteristic may be based on at least one of a specific date or a specific time that the blockchain transaction mediums are held at the first user device 205 and/or held at the second user device 215. For example, a set of blockchain transaction mediums may be uniquely marked by being present at the first user device 205 on Dec. 22, 2019 at noon. In this way, the combination of a computer identity and presence at each or both of the first user device 205 and the second user device 215 on specific dates and/or at specific times may be used to uniquely mark the set of blockchain transaction mediums. In additional embodiments, the first identifiable characteristic may be based on at least one of a specific date or a specific time that the blockchain transaction mediums are transacted from the user devices. In this way, the unique marking for the set of blockchain transaction mediums may be that they are exchanged from the first user device 205 on a specific date or in a specific timeframe on a specific date or specific dates.

In the above examples, the unique marking may be a characteristic about blockchain transaction mediums, such as characteristics recorded in or otherwise derivable from records maintained in blocks of a blockchain. In other examples, the unique marking may be added directly to a blockchain transaction medium such as in a header or field of a data layout of the blockchain transaction medium. A method of marking a set of blockchain transaction mediums may include adding a persistent identification to each of the blockchain transaction mediums to uniquely mark the blockchain transaction mediums in a manner that cannot be altered.

In some embodiments, the first identifiable characteristic may include a media access control address (MAC address) of a computer such as the first user device 205. In some embodiments, the first identifiable characteristic may include a central processing unit serial number (CPU serial number) of a computer such as the first user device 205. In some embodiments, the first identifiable characteristic may include a hard disk drive serial number (HDD serial number) of a computer such as the first user device 205. In these embodiments, the first identifiable characteristic may be a persistent unique marking added to a data layout of the blockchain transaction mediums or may be a unique marking added to or otherwise derivable from records in blocks of the blockchain that records transactions involving the blockchain transaction mediums.

In accordance with embodiments consistent with the description of FIG. 2A (and FIG. 2B), a method for dedicating a set of blockchain transaction mediums to a common commitment may include obtaining a set of blockchain transaction mediums at a first networked transaction node. The first networked transaction node may be or may include a computer such as the first user device 205. The method may also include individually transacting each of the blockchain transaction mediums to a second networked transaction node. The second networked transaction node may be or may include a computer such as the second user device 215. The method may also include individually and separately updating a block of a blockchain for each of the blockchain transaction mediums to uniquely mark each of the blockchain transaction mediums with a first identifiable characteristic dedicated only to the set of blockchain transaction mediums.

The common commitment to which a set of blockchain transaction mediums are dedicated may be, for example, a goal of a group of researchers researching a topic to solve a problem. The blockchain transaction mediums may be dedicated as a set to the group of researchers as an incentive to reach the goal by solving the problem.

In some embodiments, transactions involving the blockchain transaction mediums may be subject to heightened security measures compared to transactions involving other blockchain transaction mediums. For example, in some embodiments, the blockchain transaction mediums may be electronic tokens transacted subject to heightened security measures compared to electronic coins underlying the blockchain transaction mediums. In other examples, the blockchain transaction mediums may be electronic tokens, and may require a user to confirm a transaction using a password, a biometric input such as a fingerprint, or may require multiple transactions such as confirmation through a secondary user device other than one of the set of user devices in FIG. 2A (or FIG. 2B). The heightened security measures may be used to ensure users do not inadvertently transact blockchain transaction mediums that may be valued much higher than default or notional values of the blockchain transaction mediums of the same type but without the unique markings. In other words, the blockchain-based transactions using the technology described herein may involve monetary amounts far higher than default or notional values of blockchain transaction mediums used for the transactions, and therefore may invite such heightened security measures.

FIG. 2B illustrates a transaction network for blockchain-based transaction mechanisms, in accordance with a representative embodiment.

In FIG. 2B, the transaction network 200 includes a blockchain network 250 and a set of user devices including the first user device 205, the second user device 215, a third user device 225, a fourth user device 235, a fifth user device 245 and a sixth user device 255. The set of user devices in FIG. 2B may communicate over electronic communication networks such as the internet. Additionally, the set of user devices in FIG. 2B may communicate with blockchain transaction nodes in the blockchain network 250. The blockchain transaction nodes in the blockchain network 250 in FIG. 2B may also communicate over the one or more electronic communications networks such as the internet. Electronic communications networks by which the set of user devices and the blockchain transaction nodes in the blockchain network 250 in FIG. 2B communicate may be wired or wireless.

The transaction network 200 in FIB. 2B may be coordinated as a whole to perform functions described herein. For example, each of the first user device 205, the second user device 215, the third user device 225, the fourth user device 235, the fifth user device 245 and the sixth user device 255 may be individually programmed to perform coordinated functionality described herein. Additionally or alternatively, as shown in and described with respect to FIG. 9, a central controller such as the central controller 995 in FIG. 9 (e.g., a server) may coordinate the functionality of the set of user devices in FIG. 2B. Compared to the transaction network 200 in FIG. 2A, more than two user devices are included in the set of user devices which conduct transactions and generate transaction information and/or transaction records of the transactions in FIG. 2B. While the transaction network 200 is shown with six user devices, a set of user devices in the transaction network 200 in FIG. 2B may include as few as two user devices or more than six user devices. For example, transactions between hundreds of user devices in the transaction network 200 may be coordinated for the purposes described herein.

Networked transaction nodes described herein may each include one of the set of user devices in FIG. 2B. For example, a first networked transaction node may include the first user device 205 and affiliated devices connected to the first user device 205 such as a monitor and/or a printer. A second networked transaction node may include the second user device 215 and affiliated devices connected to the second user device 215. A third networked transaction node may include the third user device 225 and affiliated devices connected to the third user device 225. A fourth networked transaction node may include the fourth user device 235 and affiliated devices connected to the fourth user device 235. A fifth networked transaction node may include the fifth user device 245 and affiliated devices connected to the fifth user device 245. A sixth networked transaction node may include the sixth user device 255 and affiliated devices connected to the sixth user device 255.

Unique marking in embodiments consistent with the teachings of FIG. 2B may be based on at least the same features as in the embodiments consistent with the teachings of FIG. 2A. Accordingly, the unique marking may be based on any combination of at least:
- identity of computers or computer components in one or more of the set of user devices in FIG. 2B;
- durations of time held at one or more of the set of user devices in FIG. 2B.
- date and/or times at which the blockchain transaction mediums are held at one or more of the set of user devices in FIG. 2B
- date and/or times at which the blockchain transaction mediums are transacted from one or more of the set of user devices in FIG. 2B

Also in embodiments consistent with the teachings of FIG. 2B, the unique marking may be based on a sequence of transactions among the set of user devices. For example, a first set of blockchain transaction mediums may be uniquely marked by a sequence of transactions from the first user device 205 to the second user device 215, from the second user device 215 to the third user device 225, from the third user device 225 to the fourth user device 235, from the fourth user device 235 to the fifth user device 245, and from the fifth user device 245 to the sixth user device 255. A completely different second set of blockchain transaction mediums may be uniquely marked by reversing the sequence for the first set, thereby conducting transactions in the reverse order starting from the sixth user device 255 to the fifth user device 245. The unique marking may include other characteristics such as the identity of the computers or computer components in the set of user devices, durations at which the blockchain transaction mediums are held at one or more of the set of user devices, and date and/or time details as described herein.

In accordance with embodiments consistent with the description of FIG. 2B, a method may include individually transacting each of the blockchain transaction mediums from the second user device 215 to the third user device 225. The method may also include individually and separately updating one or more blocks of the blockchain for each of the blockchain transaction mediums to uniquely mark each of the blockchain transaction mediums with a second identifiable characteristic dedicated only to the set of blockchain transaction mediums. The second identifiable characteristic may be any of those described already in the context of the description of FIG. 2A and FIG. 2B above. The second identifiable characteristic may therefore be specific to the second user device 215, the third user device 225, times at which the blockchain transaction mediums are stored on these user devices, and/or transacted from these user devices. The second identifiable characteristic may also be stored in records of the transactions involving the blockchain transaction mediums, and/or may be stored directly in the blockchain transaction mediums such as by modifying headers or fields of data layouts of blockchain transaction mediums. In some embodiments, multiple different blocks of the blockchain may be updated to uniquely mark each of the blockchain transaction mediums with the first identifiable characteristic and to uniquely mark each of the blockchain transaction mediums with the second identifiable characteristic. Therefore, multiple different unique markings may be marked on or for a set of blockchain transaction mediums so that they can be readily identified later as belonging to a particular set.

In some embodiments, the first identifiable characteristic is based on sequential movement of the blockchain transaction mediums from the first user device 205 to the second user device 215. In the context of FIG. 2B, the first identifiable characteristic may be based on sequential movement among more than just two user devices, such as when a sequence of transactions among a centrally-coordinated daisy chain of user devices is used to uniquely mark each of a set of blockchain transaction mediums. In some embodiments, the first identifiable characteristic may also or alternatively be based on at least one of a specific date or a specific time that the blockchain transaction mediums are transacted from the first user device 205 and from the second user device 215. In this way, timing of exchanges from each of multiple user devices may be used to uniquely mark a set of blockchain transaction mediums.

In some embodiments, a sequence of transactions involving the blockchain transaction mediums, including a first transaction and a second transaction, may be predetermined. For example, the entire sequence shown in and described with respect to FIG. 2B may be predetermined and coordinated for each and every blockchain transaction medium in a set. Accordingly, the first identifiable characteristic and/or a second identifiable characteristic may be based on the sequence. The sequence may involve fewer or more individual transactions and user devices than shown in FIG. 2B and may involve sometimes transacting the blockchain transaction mediums through one or more individual user devices more than once. That is, one or more individual user devices may receive and send the set of blockchain transaction mediums more than once in a sequence used to uniquely mark the set of blockchain transaction mediums.

FIG. 2C illustrates a user device in a transaction network for blockchain-based transaction mechanisms, in accordance with a representative embodiment.

The first user device 205 in FIG. 2C may be any type of user device that communicates directly or indirectly over a network and that includes a processor 2051 and a memory 2052 with a wallet 20525 as described herein. The memory 2052 may store instructions, and the processor 2051 may execute the instructions to implement processes as described herein.

The wallet 20525 may be an executable software program stored in the memory 2052. It will be understood that the wallet 20525 functions by interacting with other devices such as servers and other user devices and with other applications such as other wallets stored in memories of other user devices.

The wallet 20525 may be used to initiate transactions with other wallets, so as to exchange blockchain transaction mediums with something else such as currency. The wallet 20525 may also store blockchain transaction mediums or mechanisms for controlling blockchain transaction mediums on external devices such as at an electronic exchange dedicated to storing and transacting blockchain transaction mediums. The wallet 20525 may interact with a user of the first user device 205 so as to provide information such as an account balance, a record of planned and/or executed exchanges, and/or market prices for the blockchain transaction mediums based on most recent transactions. The information provided by the wallet 20525 may be provided by a graphical user interface (not shown) on the first user device 205, or by audio announcement.

In some embodiments consistent with the description of FIG. 2C, a record of each transaction using the blockchain transaction mediums is displayable on a user interface corresponding to an electronic wallet such as the wallet 20525 dedicated to a predetermined user involved in the transaction. That is, the previous transactions involving any particular blockchain transaction medium may be viewed via a wallet 20525, even if this requires requesting the records from the blockchain network 250. For example, a user may request that one or more blockchain transaction node(s) search through the version(s) of the blockchain maintained by the blockchain transaction node(s) and identify and retrieve summaries of prior transactions involving any particular blockchain transaction medium.

Additionally, in some embodiments consistent with the description of FIG. 2C, each transaction using the blockchain transaction mediums is recorded in at least one electronic wallet dedicated to a predetermined user. That is, electronic wallets such as the wallet 20525 may be dedicated to and controlled by specific users, so that interactions with the electronic wallets are necessarily with predetermined users. Additionally, the transactions may be recorded in the same memory as the electronic wallets. In one embodiment, the electronic wallets may automatically confirm, or selectively confirm, transactions upon requests from downstream or upstream holders of blockchain transaction mediums that passed through the electronic wallets. In this way, a history of transactions involving blockchain transaction mediums may be accessible upon request from upstream and/or downstream holders of the blockchain transaction mediums. The history of transactions may therefore be confirmable by requests to the electronic wallets in addition to the customary confirmation processes involving blockchain networks such as the blockchain network 250.

Figure 2D:
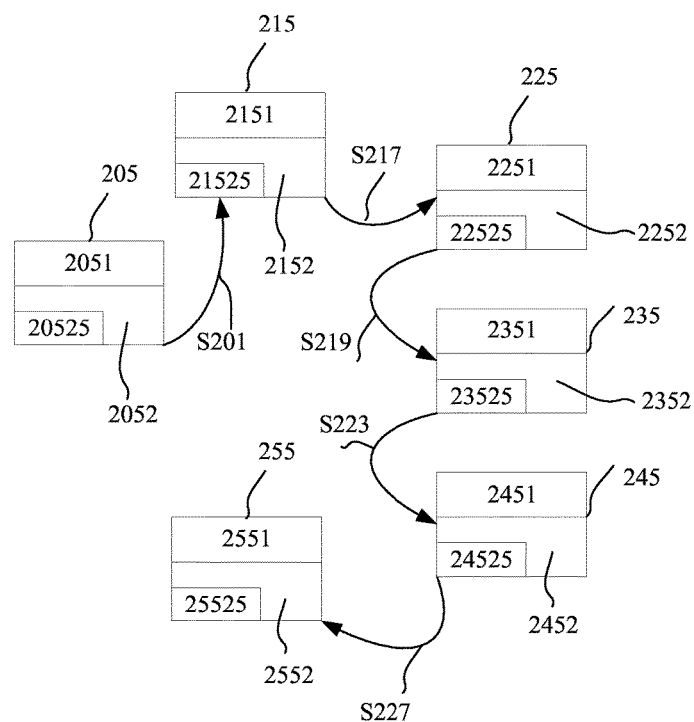
FIG. 2D illustrates a transaction flow for blockchain transaction mediums using the transaction network for blockchain-based transaction mechanisms of FIG. 2B, in accordance with a representative embodiment.

FIG. 2D illustrates a transaction flow for blockchain transaction mediums using the transaction network for blockchain-based transaction mechanisms of FIG. 2B, in accordance with a representative embodiment.

In FIG. 2D, the set of user devices from FIG. 2B are shown in more detail. The first user device 205 includes the processor 2051 and the memory 2052 with the wallet 20525. The second user device 215 includes a second processor 2151 and a second memory 2152 with a second wallet 21525. The third user device 225 includes a third processor 2251 and a third memory 2252 with a third wallet 22525. The fourth user device 235 includes a fourth processor 2351 and a fourth memory 2352 with a fourth wallet 23525. The fifth user device 245 includes a fifth processor 2451 and a fifth memory 2452 with a fifth wallet 24525. The sixth user device 255 includes a sixth processor 2551 and a sixth memory 2552 with a sixth wallet 25525.

In the transaction flow of FIG. 2D, blockchain transaction mediums are exchanged between the first user device 205 and the second user device 215 at S201. Blockchain transaction mediums are exchanged between the second user device 215 and the third user device 225 at S217. Blockchain transaction mediums are exchanged between the third user device 225 and the fourth user device 235 at S219. Blockchain transaction mediums are exchanged between the fourth user device 235 and the fifth user device 245 at S223. Blockchain transaction mediums are exchanged between the fifth user device 245 and the sixth user device 255 at S227.

In some embodiments consistent with the description of FIG. 2D, the blockchain transaction mediums are individually transacted between two blockchain wallet applications such as the wallet 20525 or other wallets described above and installed on two separate user devices registered to two separate users. The two blockchain wallet applications transact blockchain transaction mediums in accordance with a blockchain protocol. The blockchain wallet applications may be pre-installed on user devices such as smartphones, or more likely may be retrieved from an online application store that provides applications such as blockchain wallet applications on-demand.

FIG. 2E illustrates a blockchain network in the transaction network for blockchain-based transaction mechanisms in FIG. 2A and the transaction network for blockchain-based transaction mechanisms in FIG. 2B, in accordance with a representative embodiment.

In FIG. 2E, the blockchain network 250 in the transaction network 200 includes a first blockchain transaction node 210, a second blockchain transaction node 220, a third blockchain transaction node 230, a fourth blockchain transaction node 240, and a fifth blockchain transaction node 260. The first blockchain transaction node 210 is shown to notify the second blockchain transaction node 220 of a transaction involving one or more of the sets of user devices in FIG. A, FIG. B or FIG. 2D. The second blockchain transaction node 220 is shown to notify the third blockchain transaction node 230 of the transaction involving one or more of the sets of user devices in FIG. A, FIG. B or FIG. 2D. The third blockchain transaction node 230 is shown to notify the fourth blockchain transaction node 240 of the transaction involving one or more of the sets of user devices in FIG. A, FIG. B or FIG. 2D. The fourth blockchain transaction node 240 is shown to notify the fifth blockchain transaction node 260 of the transaction involving one or more of the sets of user devices in FIG. A, FIG. B or FIG. 2D.

In the embodiment of FIG. 2E, one or more of the user devices in FIG. A, FIG. B or FIG. 2D notify the first blockchain transaction node 210 of the transaction. However, the one or more of the user devices may notify more than one of the blockchain transaction nodes in FIG. 2E directly. Additionally, in the embodiment of FIG. 2E, the notifications between the blockchain transaction nodes are shown to be performed in a daisy chain on a one-to-one basis. However, one or more of the blockchain transaction nodes in FIG. 2E may notify multiple of the other blockchain transaction nodes of the transaction involving one or more of the user devices. For example, the first blockchain transaction node 210 may notify the second blockchain transaction node 220, the third blockchain transaction node 230, the fourth blockchain transaction node 240 and the fifth blockchain transaction node 260 of the transaction involving one or more of the user devices. Moreover, in the embodiment of FIG. 2E, the blockchain network 250 is shown to include five blockchain transaction nodes. However, the blockchain network 250 may include fewer or more than five blockchain transaction nodes.

FIG. 2F illustrates a blockchain transaction node in the blockchain network in the transaction network in FIG. 2E, in accordance with a representative embodiment.

In FIG. 2F, the first blockchain transaction node 210 includes a processor 2101 and a memory 2102 with a cryptographic program 21025. The cryptographic program 21025 is used to create the version of the blockchain 299 maintained by the first blockchain transaction node 210. The memory 2102 stores instructions including the cryptographic program 21025 that are executed by the processor 2101. Each blockchain transaction node in the blockchain network 250 described herein may be assumed to have a configuration consistent with the first blockchain transaction node 210 shown in FIG. 2F.

FIG. 2G illustrates another transaction flow for blockchain transaction mediums using the transaction network for blockchain-based transaction mechanisms of FIG. 2B, in accordance with a representative embodiment.

In FIG. 2G, an example implementation of the dedicated identifiable characteristic for a set of blockchain transaction mediums is shown. In this example, a first blockchain transaction medium is transacted between five or more blockchain transaction nodes, and then a second blockchain transaction medium is transacted between the same five or more blockchain transaction nodes. The first blockchain transaction medium and the second blockchain transaction medium may be part of a set that includes hundreds, thousands, tens of thousands, hundreds of thousands, or even more blockchain transaction mediums all uniquely marked with the same unique characteristic or characteristics.

In the first transaction flow of FIG. 2G, blockchain transaction mediums may be exchanged between a second user device (e.g., the second user device 215) and a third user device (e.g., the third user device 225) at S217A. Blockchain transaction mediums are exchanged between the third user device and a fourth user device (e.g., the fourth user device 235) at S219A. Blockchain transaction mediums are exchanged between the fourth user device and a fifth user device (e.g., the fifth user device 245) at S223A. Blockchain transaction mediums are exchanged between the fifth user device and a sixth user device (e.g., the sixth user device 255) at S227A. Additional exchanges may be made in the first transaction flow, such as between a first user device (e.g., the first user device 205) and the second user device, and/or between the sixth user device and a seventh user device (not shown). In the embodiment of FIG. 2G, multiple blockchain transaction mediums are transacted between the same blockchain transaction nodes. The sequence, timing, order, timeframe or other identifiable characteristics of the transactions may be used as an identifiable characteristics (e.g., a first identifiable characteristic, a second identifiable characteristic, a third identifiable characteristic, a fourth identifiable characteristic). The details of the transactions may be used to isolate the blockchain transaction mediums involved in the transactions from a much larger set of blockchain transaction mediums that do not possess the same identifiable characteristic(s).

In the second transaction flow of FIG. 2G, blockchain transaction mediums may be exchanged between the second user device and the third user device at S217B. Blockchain transaction mediums are exchanged between the third user device and the fourth user device at S219B. Blockchain transaction mediums are exchanged between the fourth user device and the fifth user device at S223B. Blockchain transaction mediums are exchanged between the fifth user device and the sixth user device at S227B. Additional exchanges may be made in the second transaction flow, such as between a first user device and the second user device, and/or between the sixth user device and a seventh user device (not shown). In the embodiment of FIG. 2G, the characteristic(s) that uniquely mark each of the blockchain transaction mediums may be based on the transactions, such as the sequence, timing, order, timeframe or other identifiable characteristics of the transactions.

In accordance with some embodiments consistent with the description of FIG. 2G, financial transactions are correlated with the blockchain transaction mediums. For example, securities issued to research employees dedicated to a common commitment may reference the blockchain transaction mediums uniquely marked as described herein in order to readily provide for electronic transactions.

Figure 3:
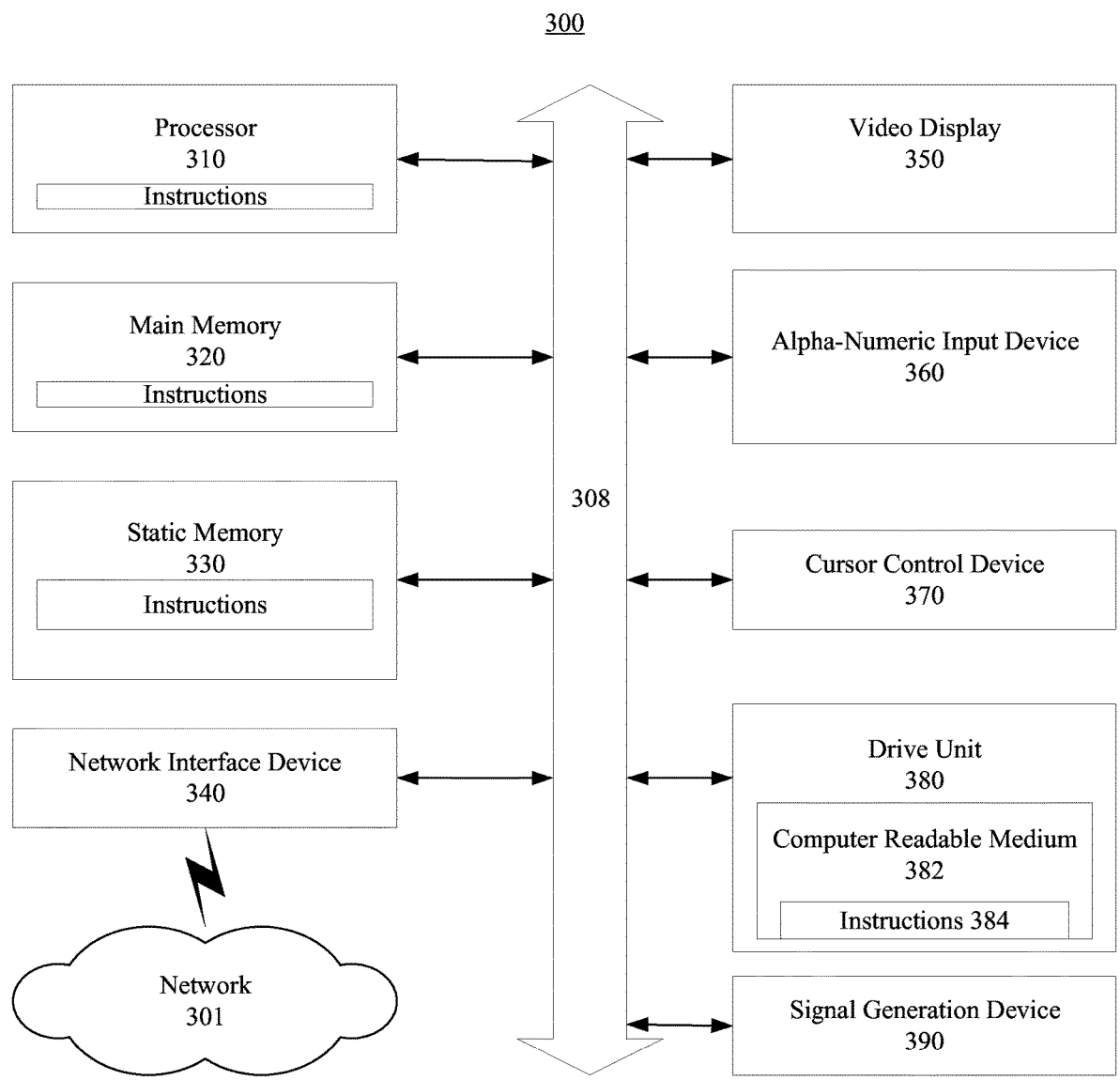
FIG. 3 illustrates a computer system, on which a method for implementing blockchain-based transaction mechanisms is implemented, in accordance with another representative embodiment.

FIG. 3 illustrates a computer system, on which a method for implementing blockchain-based transaction mechanisms is implemented, in accordance with another representative embodiment.

The computer system 300 of FIG. 3 shows a complete set of components for a communications device or a computer device. However, a "computer" as described herein may be implemented with less than the set of components of FIG. 3, such as by at least a memory and processor combination. The computer system 300 may include some or all elements of one or more component apparatuses in a system for blockchain-based transaction mechanisms herein, although any such apparatus may not necessarily include one or more of the elements described for the computer system 300 and may include other elements not described.

Referring to FIG. 3, the computer system 300 includes a set of software instructions that can be executed to cause the computer system 300 to perform any of the methods or computer-based functions disclosed herein. The computer system 300 may operate as a standalone device or may be connected, for example, using a network 301, to other computer systems or peripheral devices. In embodiments, a computer system 300 performs logical processing based on digital signals received via an analog-to-digital converter.

In a networked deployment, the computer system 300 operates in the capacity of a server or as a client user computer in a server-client user network environment, or as a peer computer system in a peer-to-peer (or distributed) network environment. The computer system 300 can also be implemented as or incorporated into various devices, such as a computer at any user device or blockchain transaction node described herein, a server, a stationary computer, a mobile computer, a personal computer (PC), a laptop computer, a tablet computer, or any other machine capable of executing a set of software instructions (sequential or otherwise) that specify actions to be taken by that machine. The computer system 300 can be incorporated as or in a device that in turn is in an integrated system that includes additional devices. In an embodiment, the computer system 300 can be implemented using electronic devices that provide voice, video or data communication. Further, while the computer system 300 is illustrated in the singular, the term "system" shall also be taken to include any collection of systems or sub-systems that individually or jointly execute a set, or multiple sets, of software instructions to perform one or more computer functions.

As illustrated in FIG. 3, the computer system 300 includes a processor 310. The processor 310 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 310 is an article of manufacture and/or a machine component. The processor 310 is configured to execute software instructions to perform functions as described in the various embodiments herein. The processor 310 may be a general-purpose processor or may be part of an application specific integrated circuit (ASIC). The processor 310 may also be a microprocessor, a microcomputer, a processor chip, a controller, a microcontroller, a digital signal processor (DSP), a state machine, or a programmable logic device. The processor 310 may also be a logical circuit, including a programmable gate array (PGA), such as a field programmable gate array (FPGA), or another type of circuit that includes discrete gate and/or transistor logic. The processor 310 may be a central processing unit (CPU), a graphics processing unit (GPU), or both. Additionally, any processor described herein may include multiple processors, parallel processors, or both. Multiple processors may be included in, or coupled to, a single device or multiple devices.

The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems. The term computing device should also be interpreted to include a collection or network of computing devices each including a processor or processors. Programs have software instructions performed by one or multiple processors that may be within the same computing device or which may be distributed across multiple computing devices.

The computer system 300 further includes a main memory 320 and a static memory 330, where memories in the computer system 300 communicate with each other and the processor 310 via a bus 308. Memories described herein are tangible storage mediums for storing data and executable software instructions and are non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The main memory 320 and the static memory 330 are articles of manufacture and/or machine components. The main memory 320 and the static memory 330 are computer-readable mediums from which data and executable software instructions can be read by a computer (e.g., the processor 310). Each of the main memory 320 and the static memory 330 may be implemented as one or more of random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. The memories may be volatile or non-volatile, secure and/or encrypted, unsecure and/or unencrypted.

"Memory" is an example of a computer-readable storage medium. Computer memory is any memory which is directly accessible to a processor. Examples of computer memory include, but are not limited to RAM memory, registers, and register files. References to "computer memory" or "memory" should be interpreted as possibly being multiple memories. The memory may for instance be multiple memories within the same computer system. The memory may also be multiple memories distributed amongst multiple computer systems or computing devices.

As shown, the computer system 300 further includes a video display unit 350, such as a liquid crystal display (LCD), an organic light emitting diode (OLED), a flat panel display, a solid-state display, or a cathode ray tube (CRT), for example. Additionally, the computer system 300 includes an input device 360, such as a keyboard/virtual keyboard or touch-sensitive input screen or speech input with speech recognition, and a cursor control device 370, such as a mouse or touch-sensitive input screen or pad. The computer system 300 also optionally includes a disk drive unit 380, a signal generation device 390, such as a speaker or remote control, and/or a network interface device 340.

In an embodiment, as depicted in FIG. 3, the disk drive unit 380 includes a computer-readable medium 382 in which one or more sets of software instructions 384 (software) are embedded. The sets of software instructions 384 are read from the computer-readable medium 382 to be executed by the processor 310. Further, the software instructions 384, when executed by the processor 310, perform one or more steps of the methods and processes as described herein. In an embodiment, the software instructions 384 reside all or in part within the main memory 320, the static memory 330 and/or the processor 310 during execution by the computer system 300. Further, the computer-readable medium 382 may include software instructions 384 or receive and execute software instructions 384 responsive to a propagated signal, so that a device connected to a network 301 communicates voice, video or data over the network 301. The software instructions 384 may be transmitted or received over the network 301 via the network interface device 340.

In an embodiment, dedicated hardware implementations, such as application-specific integrated circuits (ASICs), field programmable gate arrays (FPGAs), programmable logic arrays and other hardware components, are constructed to implement one or more of the methods described herein.

One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

FIG. 4A illustrates a process flow for blockchain-based transaction mechanisms, in accordance with another representative embodiment.

In FIG. 4A, a transaction at S401 involves a blockchain transaction medium provided to a second user device 415. At S411, the blockchain transaction medium is provided from the second user device 415 in another transaction to a trusted third party 465, such as a computer at an independent third-party such as a financial institution. At S421, the blockchain transaction medium is provided in another transaction from the trusted third party 465 to a third user device 425. At S431, the blockchain transaction medium is provided in another transaction from the third user device 425 to a fourth user device 435. At S441, the blockchain transaction medium is provided from the fourth user device 435 to a fifth user device 445.

In the embodiment of FIG. 4A, a sequence of transactions that is used as the unique marking for blockchain transaction mediums includes transactions involving a trusted third-party. The trusted third-party may be a financial institution, a bank, an exchange, an authentication service, or any other service that may improve the trustworthiness of the blockchain transaction mediums. Although not shown, more than one trusted third-party may be included in the sequence of transactions. Additionally, although the transactions involving the trusted third-party are the second transaction and the third transaction in FIG. 4A, the trusted third-party may be involved in transactions earlier or later in the sequence. For example, the sequence may start with a transaction in which the trusted third-party provided the blockchain transaction medium.

Also, though not shown in FIG. 4A, the same sequence may be provided repeatedly for each blockchain transaction medium that is dedicated to a common commitment. For example, when a set of blockchain transaction mediums are to be correlated with securities that have rights to receive royalties, a predetermined number of blockchain transaction mediums may be subject to the sequence in FIG. 4A so that the predetermined blockchain transaction mediums can be assigned on a one-to-one basis or another basis to the securities.

In some embodiments consistent with FIG. 4A, a method for dedicating a set of blockchain transaction mediums may include validating, through a trusted third-party service such as the trusted third party 465, a total count of transactions involving the blockchain transaction mediums at the first user device 405 or at another user device such as the second user device 415. For example, the trusted third party 465 may count the number of prior transactions involving each blockchain transaction medium received in a transaction from the second user device 415. This count may be used to select only blockchain transaction mediums with a total number of prior transactions beneath a threshold for inclusion in the set of blockchain transaction mediums. Given the nature of consensus-based blockchain recordkeeping, control of this count can be used to bias control of the set of blockchain transaction mediums in favor of an issuer of the set of blockchain transaction mediums in terms of the common commitment. In other words, when an issuer of the set of blockchain transaction mediums wants to piggyback the common commitment as a special purpose for selected blockchain transaction mediums that otherwise belong to a larger default group, the issuer may select those that are minimally transacted already, so as to ensure some level of control in latter disputes in transactions involving the set of blockchain transaction mediums. The threshold may be a maximum number of prior transactions allowed for inclusion in the set of blockchain transaction mediums.

That is, in some embodiments consistent with the descriptions of FIG. 4A, a method for dedicating a set of blockchain transaction mediums may include determining a number of prior transactions for each electronic token among the blockchain transaction mediums; comparing the number of prior transactions for each electronic token among the blockchain transaction mediums against a threshold; and individually transacting each of the blockchain transaction mediums to the next user device in a sequence only when the number of prior transactions for each of the blockchain transaction mediums is lower than the threshold. Of course, in FIG. 4A the count may be performed by a trusted third party 465, but such a count may also be performed by one of the user devices in FIG. 4A. Also, as another benefit of minimizing the counts for blockchain transaction mediums included in a set, any later checks on history for the blockchain transaction mediums (e.g., a token) may involve minimal processing, which in turns allows for weighting the control of the set of blockchain transaction mediums in favor of the issuer via use of a coordinated daisy chain of user devices for transactions.

As also noted previously, the unique markings for a set of blockchain transaction mediums may be added to or otherwise derivable from records of transactions involving the blockchain transaction mediums. Alternatively, in the embodiments of FIG. 4A (described above) of FIG. 4B (described below), the unique markings may be added by adding a persistent identification to each of the blockchain transaction mediums to uniquely mark the common commitment. A method for dedicating a set of blockchain transaction mechanisms may include verifying, through a trusted third-party service independent of the first user device 405 and independent of the second user device 415, the persistent identification added to or otherwise derivable from each of the blockchain transaction mediums. In this way, a trusted third party 465 may verify a total number of blockchain transaction mediums to which the persistent identification is added so that the total number is verified by the trusted third-party service using a server such as the server of the trusted third party 465.

In embodiments consistent with the description of FIG. 4A, a method for dedicating sets of blockchain transaction mediums to common commitments may include assigning both a first set of blockchain transaction mediums to a first common commitment and assigning a second set of blockchain transaction mediums to a second common commitment. Specifically, the method may include assigning a first set of blockchain transaction mediums to a first common commitment from a pool of blockchain transaction mediums that includes the first blockchain transaction mediums, second blockchain transaction mediums and other blockchain transaction mediums, and then dedicating the first set of blockchain transaction mediums to the first common commitment. The method may also include assigning a second set of blockchain transaction mediums to a second common commitment from the pool of blockchain transaction mediums, and then dedicating the second set of blockchain transaction mediums to the second common commitment. The method may further include transacting at least one of the first set of blockchain transaction mediums in isolation from the second set of blockchain transaction mediums and from the other blockchain transaction mediums in the pool of blockchain transaction mediums.

In the above example, the isolation of the at least one of the first set of blockchain transaction mediums may mean that the transaction itself does not involve any blockchain transaction mediums outside of the first set, that a valuation of the first set of blockchain transaction mediums is entirely independent of the valuation of blockchain transaction mediums outside of the first set, and/or that the first set of blockchain transaction mediums are treated differently than blockchain transaction mediums outside of the first set such as by the electronic exchange that facilitates the transaction. For example, the first set of blockchain transaction mediums may be exchangeable in transactions at a first value common to the pool of blockchain transaction mediums, and at a second value common only to the first set of blockchain transaction mediums. The first value common to the pool of blockchain transaction mediums may be based on valuations for the type of blockchain transaction mediums on an open market. The second value common only to the first set of blockchain transaction mediums may be specifically tied to valuations of securities tied only to the first set of blockchain transaction mediums. Additionally, the second set of blockchain transaction mediums may be exchangeable in transactions at the first value common to the pool of blockchain transaction mediums, and at a third value common only to the second set of blockchain transaction mediums. The first value for the second set may be the same as the first value for the first set and based on valuations for the type of blockchain transaction mediums on an open market. The third value common only to the second set of blockchain transaction mediums may be specifically tied to valuations of securities tied only to the second set of blockchain transaction mediums.

Also or alternatively in the above example, the first set of blockchain transaction mediums may be dedicated to a first contributor node of an entity, and the first contributor node of the entity may be committed to a first common commitment. The second set of blockchain transaction mediums may be dedicated to a second contributor node of an entity, and the second contributor node of the entity may be committed to a second common commitment. The first contributor node of the entity may correspond to a group of employees and/or contractors such as researchers and support staff dedicated to a task such as finding a cure for a disease or building a prototype system. The second contributor node of the entity may correspond to another, different, group of employees and/or contractors such as researchers and support staff dedicated to another task such as finding a different cure for the same disease, or a cure for another disease, or building another prototype system. For example, revenues generated based on efforts of the first node may be due in part to the employees and/or contractors of the first node as royalties, and revenues generated based on efforts of the second node may be due in part to the employees and/or contractors of the second node as royalties. The first set of blockchain transaction mediums and the second set of blockchain transaction mediums may be transacted on the open market based on expected returns due to the royalties. The method may also include assigning a third set of blockchain transaction mediums to at least the first contributor node of the entity and the second contributor node of the entity in common and dedicating the third set of blockchain transaction mediums to at least the first contributor node of the entity and the second contributor node of the entity. The method may further include transacting at least one of the third set of blockchain transaction mediums in isolation from the first set of blockchain transaction mediums, from the second set of blockchain transaction mediums and from the other blockchain transaction mediums in the pool of blockchain transaction mediums. For example, revenues generated based on efforts of both the first node and the second node may be due in part to the employees and/or contractors of both the first node and the second node as royalties, and the third set of blockchain transaction mediums may be transacted on the open market based on expected returns due to these royalties, separate from the first set and the second set. Members of the first contributor node of the entity may be variably compensated with the first set of blockchain transaction mediums based on contributions of the members on behalf of the first contributor node of the entity. Members of the second contributor node of the entity may be variably compensated with the second set of blockchain transaction mediums based on contributions of the members on behalf of the second contributor node of the entity. Members of both the first contributor node and of the second contributor node may be variably compensated with the third set of blockchain transaction mediums based on contributions of the members on behalf of the first contributor node and the second contributor node of the entity.

FIG. 4B illustrates another process flow for blockchain-based transaction mechanisms, in accordance with another representative embodiment.

In FIG. 4B, a transaction at S441A involves a blockchain transaction medium provided to a second user device 415. At S441B, the second user device notifies the trusted third party 465 of the transaction at S441A. The trusted third party 465 again may be a computer at an independent third-party such as a financial institution. At S442A, the blockchain transaction medium is provided from the second user device 415 to a third user device 425. At S442B, the third user device 425 notifies the trusted third party 465 of the transaction at S442A.

At S443A the blockchain transaction medium is provided in another transaction from the third user device 425 to a fourth user device 435. At S443B, the fourth user device 435 notifies the trusted third party 465 of the transaction at S443A. At S444A, the blockchain transaction medium is provided from the fourth user device 435 to a fifth user device 445. At S444B, the fifth user device 445 notifies the trusted third party 465 of the transaction at S444A.

In the embodiment of FIG. 4B, a sequence of transactions that is used as the unique marking for blockchain transaction mediums are reported individually to a trusted third-party. The trusted third-party may be a financial institution, a bank, an exchange, an authentication service, or any other service that may improve the trustworthiness of the blockchain transaction mediums by maintaining a record of individual notifications of each transaction. Although not shown, more than one trusted third-party may be notified of the sequence of transactions. Alternatively, the trusted third party 465 in FIG. 4B may be an intermediary that notifies another third-party such as a government entity of each transaction. Additionally, although the trusted third-party is notified of all of the transactions shown in FIG. 4B, the trusted third-party may be notified of fewer than all transactions, such as by a predetermined subset of the user devices in FIG. 4B. For example, the second user device 415 and the fifth user device 445 may notify the trusted third party 465 of transactions, whereas the third user device 425 and the fourth user device 435 may not be required to notify the trusted third-party.

Also, though not shown in FIG. 4B, the same sequence may be provided repeatedly for each blockchain transaction medium that is dedicated to a common commitment. For example, when a set of blockchain transaction mediums are to be correlated with securities that have rights to receive royalties, a predetermined number of blockchain transaction mediums may be subject to the sequence in FIG. 4B so that the predetermined blockchain transaction mediums can be assigned on a one-to-one basis or another basis to the securities. The trusted third party 465 may maintain records of the blockchain transaction mediums that are assigned to the securities that have rights to receive royalties. For example, the trusted third party 465 may maintain a record of dates, times and periods in which the transactions in FIG. 4B occur, and/or a record of the total number of blockchain transaction mediums subject to the sequence in FIG. 4B.

In some embodiments consistent with FIG. 4B, a method for dedicating a set of blockchain transaction mediums may include validating, through a trusted third-party service such as the trusted third party 465, a total count of transactions involving the blockchain transaction mediums at the first user device 405 and a total count of transactions involving the blockchain transaction mediums at the second user device 415. The trusted third party 465 may be provided entirely independent of the first user device 405 and the second user device 415 and may an independent service that is provided for verification purpose such as those described herein. As a result of these features, a set of blockchain transaction mediums may be selected with a minimal number of existing (prior) transactions, and these can be dedicated for further processing to provide the unique markings for the blockchain transaction mediums ultimately provided in the set. The duplicate counts may also be performed to ensure that the counts match. In an example, the counts may be performed at the beginning and end of a marking process to ensure the counts do not diverge more than expected due to the transactions between the beginning and end of the marking process.

In some embodiments consistent with the description of the method of FIG. 4B, a method for tracking a set of blockchain transaction mediums dedicated to a common commitment may include sending, via an electronic communications network from computers of holders of the blockchain transaction mediums, notifications of transactions of the blockchain transaction mediums from the holders of the blockchain transaction mediums to recipients of the blockchain transaction mediums. For example, the first user device 405 may send a notification over an electronic communications network to the third party 465 when completing a transaction to the second computer 415 as a recipient of a blockchain transaction medium. The second user device 415 may send a notification over an electronic communications network to the third party 465 when completing a transaction to the third user device 425. The third-party in this instance may be the issuer of the blockchain transaction medium or may operate on behalf of the issuer of the blockchain transaction medium to track holders of the blockchain transaction medium.

The method described immediately above may include confirming a presence of unique markings of the blockchain transaction mediums. For example, the third party 465 may request proof of information on or with the blockchain transaction mediums, such as information of previous transactions, timings, computers involved, and so on. Since the unique markings are established from the beginning, the third party 465 may be aware from the beginning of what to look for in terms of the unique markings for any particular set of blockchain transaction mediums. The method described immediately above may also include confirming identifications of the recipients of the blockchain transaction mediums as new holders of the blockchain transaction mediums. For example, the third party 465 may require a name, social security number, communications address or communications addresses, computer identification, and/or other form of identification from each recipient of the blockchain transaction medium to register the holders separate from the typical tracking provided by blockchain networks. The method described immediately above may also include updating records to reflect the new holders of the blockchain transaction mediums based on confirming the presence of unique markings of the blockchain transaction mediums and the identifications of the recipients of the blockchain transaction mediums as the new holders.

In embodiments consistent with the description of FIG. 4B, a method for tracking a set of blockchain transaction mediums dedicated to a common commitment may also include adding royalties due to the new holders of the blockchain transaction mediums to a pool due to the holders of the blockchain transaction mediums. The blockchain transaction mediums marked with the unique markings may be exchangeable in transactions at values that vary from values of blockchain transaction mediums of the same type not marked with the unique markings. The actual adding of royalties and determinations of values may be performed separate from the third party 465, such as by a financial institution or corporation.

In some embodiments, a method for tracking a set of blockchain transaction mediums may also include adding royalties due to the new holders of the blockchain transaction mediums to a pool due to the holders of the blockchain transaction mediums. The method may also include distributing royalties due to the new holders of the blockchain transaction mediums to accounts of the new holder. The blockchain transaction mediums marked with the unique markings may be exchangeable in transactions at values that vary from values of blockchain transaction mediums of the same type not marked with the unique markings. For example, the accounts may be electronic accounts associated with electronic wallets controlled by holders.

In some embodiments, the transactions of the blockchain transaction mediums may be between electronic wallets of the holders of the blockchain transaction mediums and electronic wallets of the recipients of the blockchain transaction mediums. A method for tracking a set of blockchain transaction mediums may include receiving, at a computer of an issuer of the blockchain transaction mediums, the notifications of transactions. The method may also include updating, by the computer of the issuer of the blockchain transaction mediums, the records to reflect the new holders. For example, here the computer of the issuer may be a server of the third party 465 shown in FIG. 4B. Royalties due to the new holders of the blockchain transaction mediums may be distributed to or on behalf of the new holders of the blockchain transaction mediums based on the records updated to reflect the new holders. A method for tracking a set of blockchain transaction mediums may also include distributing the royalties to the new holders via third-party financial services that provide electronic wallets to the new holders. For example, third-party intermediaries may be used to distribute royalties to electronic accounts of current holders of blockchain transaction mediums when the royalties are issued.

FIG. 4C illustrates another process flow for blockchain-based transaction mechanisms, in accordance with another representative embodiment.

In FIG. 4C, a transaction at S401 involves a blockchain transaction medium provided to a second user device 415. However, in the embodiment of FIG. 4C, the blockchain transaction medium is reduced by subtraction or division from a nominal value when received by the second user device 415. For example, if the blockchain transaction medium has a nominal value of a unit (i.e., "1") when received by the second user device 415, the blockchain transaction medium may be divided into sub-units such as one-tenth ("1/10th") or one-hundredth ("1/100"). The sub-units may each then correspond to new blockchain transaction mediums created by the second user device 415 through the subtraction or division. For example, the second user device 415 may create one hundred ("100") new blockchain transaction mediums through division of the original blockchain transaction medium received by the second user device 415.

At S411, the one of the new blockchain transaction mediums is provided in another transaction from the second user device 415 to a third user device 425. At S421, the new blockchain transaction medium is provided from the third user device 425 to a fourth user device 435. At S431, the new blockchain transaction medium is provided from the fourth user device 435 to a fifth user device 445.

In the embodiment of FIG. 4C, a sequence of transactions that is used as the unique marking for blockchain transaction mediums starts with creating new blockchain transaction mediums from a single received blockchain transaction medium. For example, a coin with a nominal value of a unit may be received and then divided into sub-coins with corresponding values of sub-units. The division may allow use of an effective blockchain protocol even when the original blockchain transaction medium has a relatively high market value, so that the division allows leveraging the effective blockchain protocol without requiring that each security incur a cost of the relatively high market value of a full unit of the blockchain transaction mediums. Although not shown, the unique marking of the blockchain transaction mediums may involve more than one reduction through subtractions or divisions. Although not shown, one or more trusted third-party may be included in the sequence of transactions, and a trusted third-party may be used to create the new blockchain transaction mediums from a single received blockchain transaction medium.

Also, though not shown in FIG. 4C, the same sequence may be provided repeatedly for each blockchain transaction medium that is dedicated to a common commitment. For example, when a set of blockchain transaction mediums are to be correlated with securities that have rights to receive royalties, a predetermined number of blockchain transaction mediums may be subject to the sequence in FIG. 4C so that the predetermined blockchain transaction mediums can be assigned on a one-to-one basis or another basis to the securities.

FIG. 4D illustrates another process flow for blockchain-based transaction mechanisms, in accordance with another representative embodiment.

In FIG. 4D, a transaction at S401 involves a blockchain transaction medium provided to a second user device 415. However, in the embodiment of FIG. 4C, the blockchain transaction medium is combined by addition with another blockchain transaction medium so that nominal values of the two blockchain transaction mediums received by the second user device 415 are combined into a single nominal value. For example, if each of a first blockchain transaction medium and a second blockchain transaction medium have nominal values of a sub-unit such as one-tenth (i.e., "1/10th") when received by the second user device 415, the blockchain transaction medium may be combined into a single sub-unit such as two-tenths ("2/10th") or two-hundredth ("2/100"). The single sub-unit may then correspond to a new blockchain transaction mediums created by the second user device 415 through the addition.

At S411, the new blockchain transaction medium is provided in another transaction from the second user device 415 to a third user device 425. At S421, the new blockchain transaction medium is provided from the third user device 425 to a fourth user device 435. At S431, the new blockchain transaction medium is provided from the fourth user device 435 to a fifth user device 445.

In the embodiment of FIG. 4D, a sequence of transactions that is used as the unique marking for blockchain transaction mediums starts with creating a new blockchain transaction medium from two or more individual received blockchain transaction mediums. For example, a blockchain transaction medium with a nominal value of a sub-unit or sub-coin may be received and combined with another blockchain transaction medium with a nominal value of a sub-unit or sub-coin. The combination may allow enhanced marking using an effective blockchain protocol with a relatively low market value, so that the combination allows leveraging the effective blockchain protocol by showing the same combination for multiple blockchain transaction mediums. Although not shown, the unique marking of the blockchain transaction mediums may involve more than one combination through addition. Although not shown, one or more trusted third-party may be included in the sequence of transactions, and a trusted third-party may be used to create the new blockchain transaction mediums from two or more individual received blockchain transaction mediums.

Also, though not shown in FIG. 4D, the same sequence may be provided repeatedly for each blockchain transaction medium that is dedicated to a common commitment. For example, when a set of blockchain transaction mediums are to be correlated with securities that have rights to receive royalties, a predetermined number of blockchain transaction mediums may be subject to the sequence in FIG. 4D so that the predetermined blockchain transaction mediums can be assigned on a one-to-one basis or another basis to the securities.

FIG. 4E illustrates another process flow for blockchain-based transaction mechanisms, in accordance with another representative embodiment.

In FIG. 4E, a transaction at S401 involves a blockchain transaction medium provided to a second user device 415. However, in the embodiment of FIG. 4E, the blockchain transaction medium is reduced by the second user device 415 in the manner of FIG. 4C such as by subtraction or division.

At S411, a new blockchain transaction medium created from the reduction by the second user device 415 is provided in another transaction from the second user device 415 to a third user device 425. However, in the embodiment of FIG. 4E, the new blockchain transaction medium is combined with another blockchain transaction medium by the third user device 425 in the manner of the combination in FIG. 4D to create a second new blockchain transaction medium. At S421, the second new blockchain transaction medium is provided from the third user device 425 to a fourth user device 435. At S331, the second new blockchain transaction medium is provided from the fourth user device 435 to a fifth user device 445.

In the embodiment of FIG. 4E, a sequence of transactions that is used as the unique marking for blockchain transaction mediums starts with creating new blockchain transaction mediums more than once, including from reduction (e.g., subtraction or division) or an original received blockchain transaction medium and from combination of two or more individual blockchain transaction mediums. Although not shown, the unique marking of the blockchain transaction mediums may involve more than one reduction and/or more than one combination through addition. Although not shown, one or more trusted third-party may be included in the sequence of transactions, and a trusted third-party may be used to create the new blockchain transaction medium(s).

Also, though not shown in FIG. 4E, the same sequence may be provided repeatedly for each blockchain transaction medium that is dedicated to a common commitment. For example, when a set of blockchain transaction mediums are to be correlated with securities that have rights to receive royalties, a predetermined number of blockchain transaction mediums may be subject to the sequence in FIG. 4E so that the predetermined blockchain transaction mediums can be assigned on a one-to-one basis or another basis to the securities.

In accordance with some embodiments consistent with the above descriptions of FIGS. 4C, 4D and/or 4E, a method for dedicating a set of blockchain transaction mediums may include dividing a electronic coin into multiple blockchain subcoins and creating the blockchain transaction mediums to each individually correspond to a different one of the blockchain subcoins. A blockchain subcoin may be a electronic coin with a value divided from an original electronic coin having a unitary value. The blockchain transaction mediums may be tokens based on one or more blockchain subcoins.

In accordance with some embodiments consistent with the above descriptions of FIGS. 4C, 4D and/or 4E, a method for dedicating a set of blockchain transaction mediums may include dividing each of multiple of electronic coins into multiple blockchain subcoins; adding at least one blockchain subcoin from one of the electronic coins to at least one blockchain subcoin from another of the electronic coins; and creating the blockchain transaction mediums to each individually correspond to combinations of the at least one blockchain subcoin from the one of the electronic coins and the at least one blockchain subcoin from another of the. In this way, a unique marking for the blockchain transaction mediums may require origins from one or both of specific original coins that were subdivided into subcoins.

Figure 5:
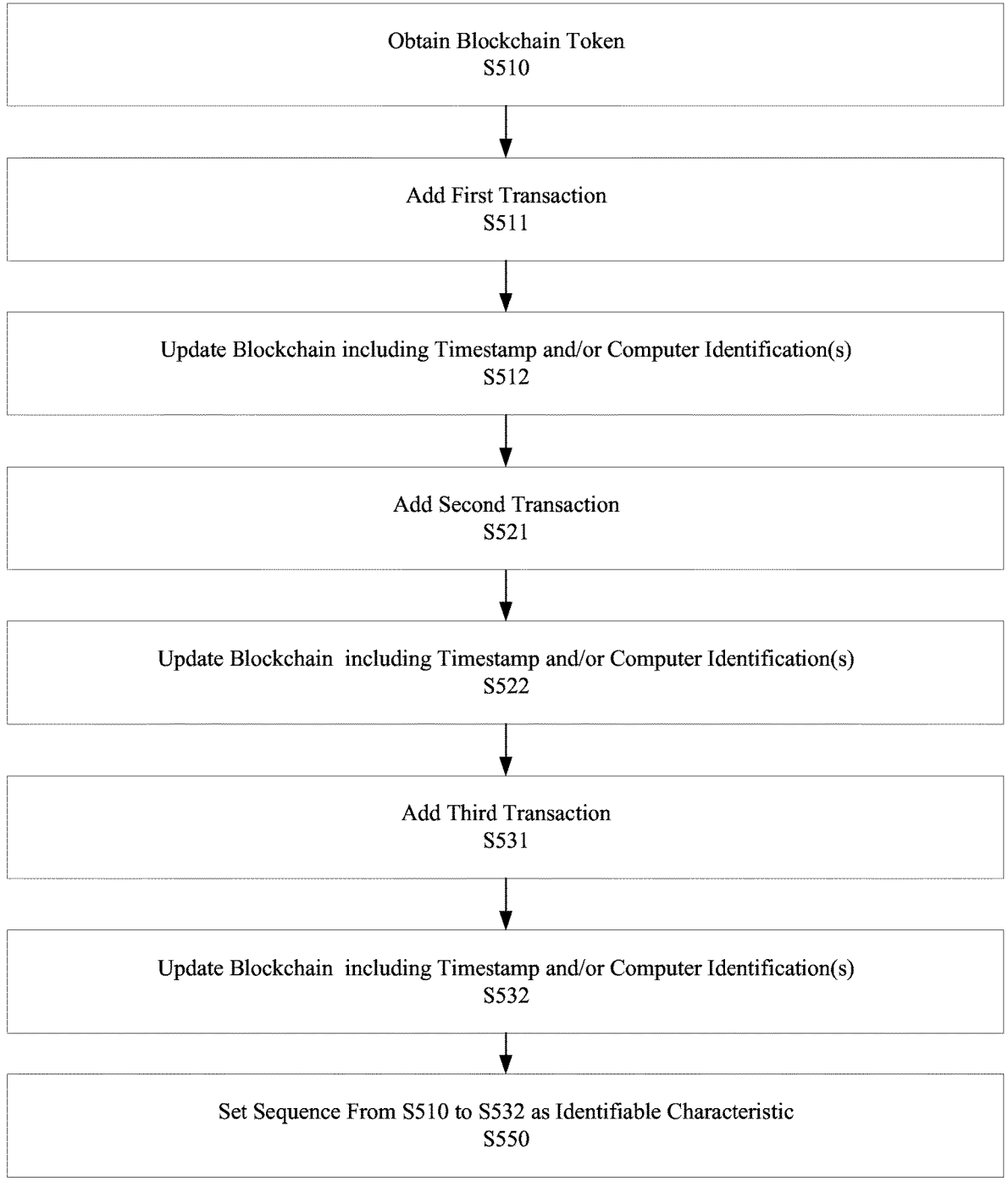
FIG. 5 illustrates a method for marking blockchain-based transaction mechanisms, in accordance with a representative embodiment.

FIG. 5 illustrates a method for marking blockchain-based transaction mechanisms, in accordance with a representative embodiment.

The process in FIG. 5 starts at S510 with obtaining a electronic token.

At S511, the process in FIG. 5 includes adding a first transaction.

At S512, the process in FIG. 5 includes updating a blockchain to include a timestamp and/or computer identification(s) from the first transaction at S511.

At S521, the process in FIG. 5 includes adding a second transaction.

At S522, the process in FIG. 5 includes updating the blockchain to include a timestamp and/or computer identification(s) from the second transaction at S521.

At S531, the process in FIG. 5 includes adding a third transaction.

At S532, the process in FIG. 4 includes updating the blockchain to include a timestamp and/or computer identification(s) from the third transaction at S531.

At S550, the sequence from S510 to S532 is set as an identifiable characteristic.

The number of transactions in the process of FIG. 5 is not limited to three. Rather, a sequence set as an identifiable characteristic for a blockchain transaction medium may include more than three transactions, such as dozens or even hundreds of transactions.

Additionally, the sequence in FIG. 5 may be applied to multiple blockchain transaction mediums, in order to isolate the multiple blockchain transaction mediums from a larger set of blockchain transaction mediums that may otherwise have some or all other characteristics of the multiple blockchain transaction mediums. For example, the identifiable characteristic used to uniquely mark the multiple blockchain transaction mediums may be used to differentiate a subset of blockchain transaction mediums from a larger set that fall under a single type of blockchain transaction mediums, such as type that fall under a single, specific blockchain protocol or standard.

In embodiments consistent with the description of FIG. 5, a method for dedicating a set of blockchain transaction mediums to a common commitment may include obtaining a set of blockchain transaction mediums at a first networked transaction node. The method may also include individually and uniquely marking each of the blockchain transaction mediums with a first identifiable characteristic dedicated only to the set of blockchain transaction mediums. As examples, the first identifiable characteristic may be based on an identification of a first specific computer at the first networked transaction node or a second specific computer at the second networked transaction node, or an identification of a first specific computer at the first networked transaction node and an identification of a second specific computer at the second networked transaction node. As other examples, the first identifiable characteristic may be based on sequential movement of the blockchain transaction mediums from the first networked transaction node to the second networked transaction node. As more examples, the first identifiable characteristic may be based on an amount of time the blockchain transaction mediums are held at a first specific computer at the first networked transaction node, or an amount of time the blockchain transaction mediums are held at a first specific computer at the first networked transaction node and at a second specific computer at the second networked transaction node. As yet even more examples, the first identifiable characteristic may be based on at least one of a specific date or a specific time that the blockchain transaction mediums are held at a first specific computer at the first networked transaction node, at least one of a specific date or a specific time that the blockchain transaction mediums are held at a first specific computer at the first networked transaction node and at a second specific computer at the second networked transaction node, at least one of a specific date or a specific time that the blockchain transaction mediums are transacted from a first specific computer at the first networked transaction node, and/or at least one of a specific date or a specific time that the blockchain transaction mediums are transacted from a first specific computer at the first networked transaction node and from a second specific computer at the second networked transaction node.

Figure 6:
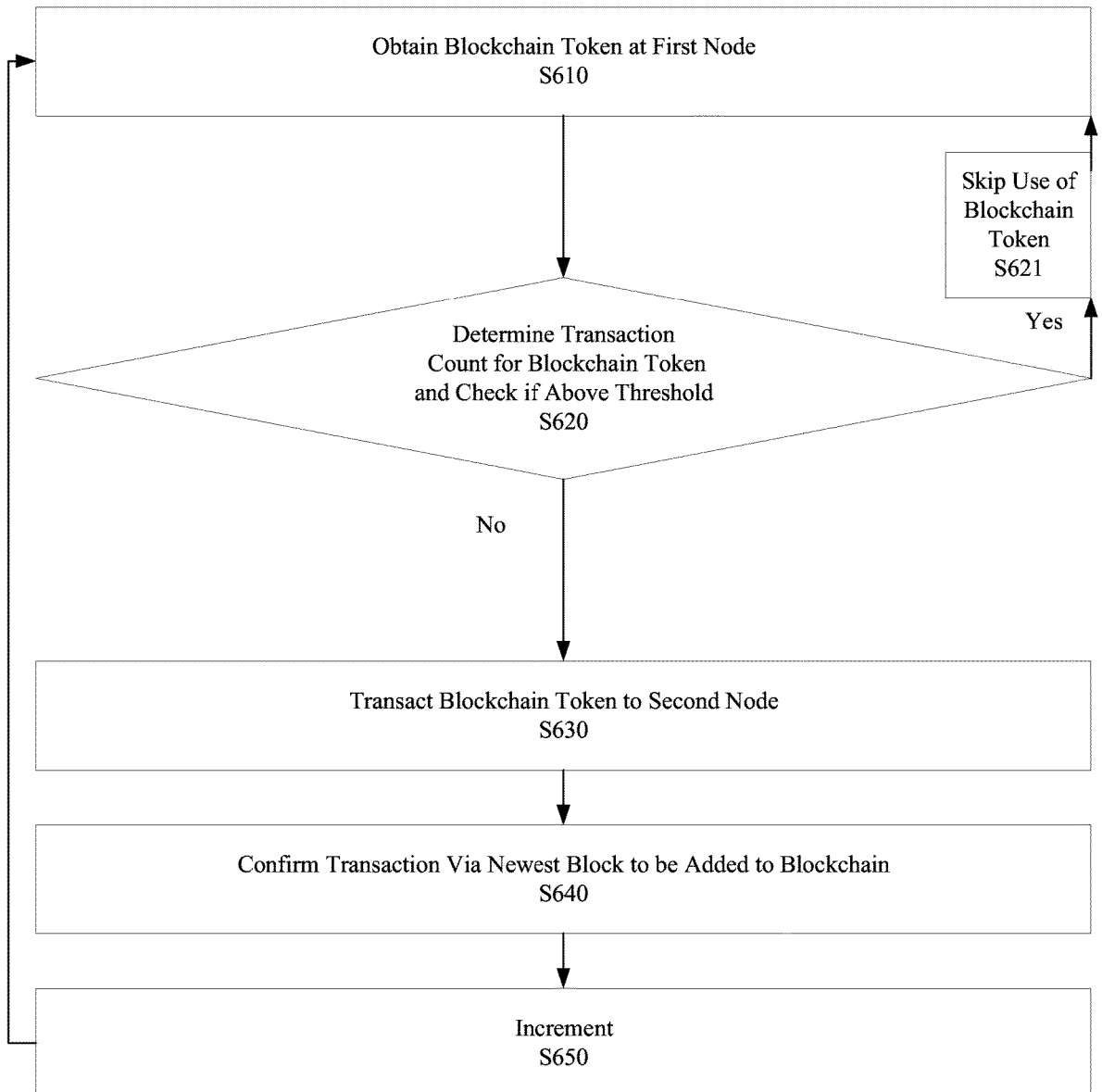
FIG. 6 illustrates a method for selecting blockchain-based transaction mechanisms, in accordance with a representative embodiment.

FIG. 6 illustrates a method for selecting blockchain-based transaction mechanisms, in accordance with a representative embodiment.

At S610, the process of FIG. 6 starts with obtaining a electronic token at a first user device.

At S620, the process of FIG. 6 includes determining a transaction count for the electronic token and checking whether the transaction count is above a threshold.

At S621, if the transaction count is above a threshold (S620=Yes) the process next skips use of the electronic token. At S630, if the transaction count is not above the threshold (S620=No) the process next transacts the electronic token to a second user device.

At S640, the process of FIG. 6 includes confirming the transaction from S630 to a newest block to be added to the blockchain. The confirmation at 6540 may include distributing a record of the transaction from S530 to each blockchain transaction node that maintains a version of the blockchain.

At S650, the process of FIG. 6 increments by one and returns to S610 to repeat the process of FIG. 6.

Figure 7A:
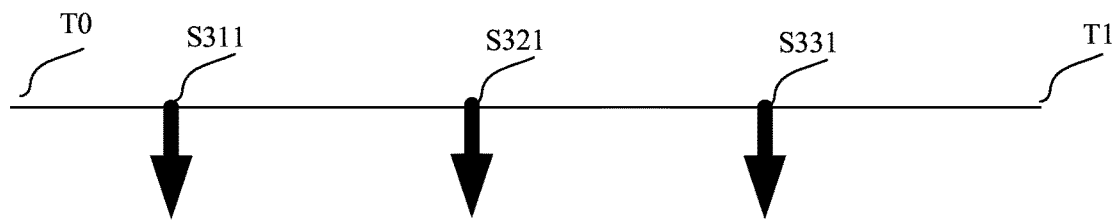
FIG. 7A illustrates a timeline for implementing blockchain-based transaction mechanisms, in accordance with a representative embodiment.

FIG. 7A illustrates a timeline for implementing blockchain-based transaction mechanisms, in accordance with a representative embodiment.

In FIG. 7A, a timeline 700A starts at a starting time T0 and ends at an ending time T1. Between the starting time T0 and the ending time T1, three different blockchain transactions are conducted including a first blockchain transaction at S411, a second blockchain transaction at S421 and a third blockchain transaction at S431.

In the embodiment of FIG. 7A, a unique marking for a blockchain transaction medium may be timestamps for each of the first, second and third transactions confirming that all three occurred between the starting time T0 and the ending time T1. The unique marking may also include an identifier of one or more computer involved in each of the first, second and third transactions. Multiple blockchain transaction mediums may be transacted in the same way between the starting time T0 and the ending time T1 to create a class of blockchain transaction mediums dedicated to the same purpose.

Figure 7B:
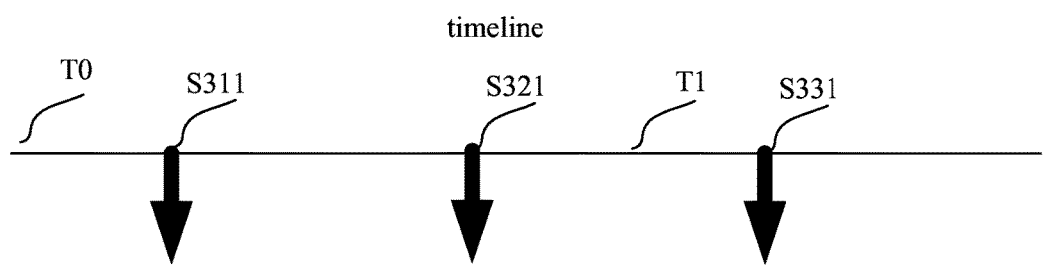
FIG. 7B illustrates another timeline for implementing blockchain-based transaction mechanisms, in accordance with a representative embodiment.

FIG. 7B illustrates another timeline for implementing blockchain-based transaction mechanisms, in accordance with a representative embodiment.

In FIG. 7B, a timeline 700B starts at a starting time T0 and ends at an ending time T1. Between the starting time T0 and the ending time T1, two different blockchain transactions are conducted including a first blockchain transaction at S411 and a second blockchain transaction at S421. A third blockchain transaction is conducted at S431 after the ending time T1. When the starting time T0 and the ending time T1 uniquely mark blockchain transaction mediums, the failure of the third blockchain transaction at S431 to be fall within the period between the starting time T0 and the ending time T1 may reflect that the blockchain transaction medium transacted at S411, S421 and S431 does not call within the class of blockchain transaction mediums marked between the starting time T0 and the ending time T1. Alternatively, the class of blockchain transaction mediums may be marked only by the transactions between parties at S411 and S421 and not by the transaction between the parties in S431, in which case these transactions falling between the starting time T0 and the ending time T1 confirms that they are within the class of blockchain transaction mediums marked between the starting time T0 and the ending time T1.

In the embodiment of FIG. 7B, a unique marking for a blockchain transaction medium may be timestamps for each of the first and second transactions or for each of the first, second and third transactions confirming that both or all three occurred between the starting time T0 and the ending time T1. The unique marking may also include an identifier of one or more computer involved in each of the first and second transactions or in each of the first, second and third transactions. Multiple blockchain transaction mediums may be transacted in the same way between the starting time T0 and the ending time T1 to create a class of blockchain transaction mediums dedicated to the same purpose.

Figure 7C:
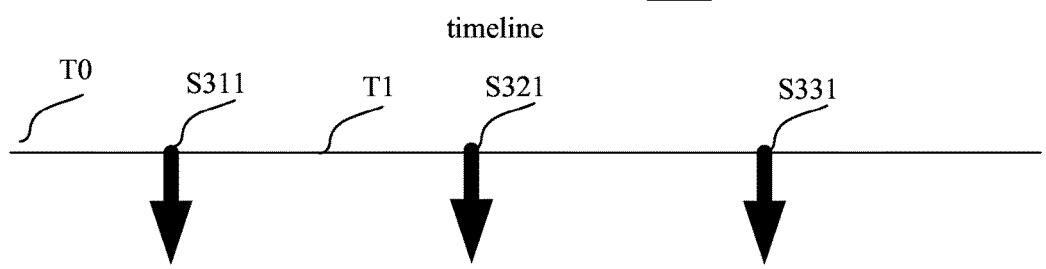
FIG. 7C illustrates another timeline for implementing blockchain-based transaction mechanisms, in accordance with a representative embodiment.

FIG. 7C illustrates another timeline for implementing blockchain-based transaction mechanisms, in accordance with a representative embodiment.

In FIG. 7C, a timeline 700C starts at a starting time T0 and ends at an ending time T1. Between the starting time T0 and the ending time T1, only a first blockchain transaction 411 is conducted. A second blockchain transaction at S421 and a third blockchain transaction are conducted at S421 and S431 after the ending time T1. When the starting time T0 and the ending time T1 uniquely mark a subset of blockchain transaction mediums, the failure of the second blockchain transaction at S421 and the third blockchain transaction at S431 to fall within the period between the starting time T0 and the ending time T1 may reflect that the blockchain transaction medium transacted at S411, S421 and S431 do not fall within the subset of blockchain transaction mediums marked between the starting time T0 and the ending time T1. Alternatively, the class of blockchain transaction mediums may be marked only by the transaction between parties at S411, and not by the transactions between the parties in S421 and S431, in which case the sole transaction falling between the starting time T0 and the ending time T1 confirms that they are within the class of blockchain transaction mediums marked between the starting time T0 and the ending time T1.

In the embodiment of FIG. 7C, a unique marking for a blockchain transaction medium may be timestamps for the first transaction confirming that the first transaction occurred between the starting time T0 and the ending time T1. The unique marking may also include an identifier of one or more computer involved in the first transaction. Multiple blockchain transaction mediums may be transacted in the same way between the starting time T0 and the ending time T1 to create a class of blockchain transaction mediums dedicated to the same purpose.

Figure 8A:
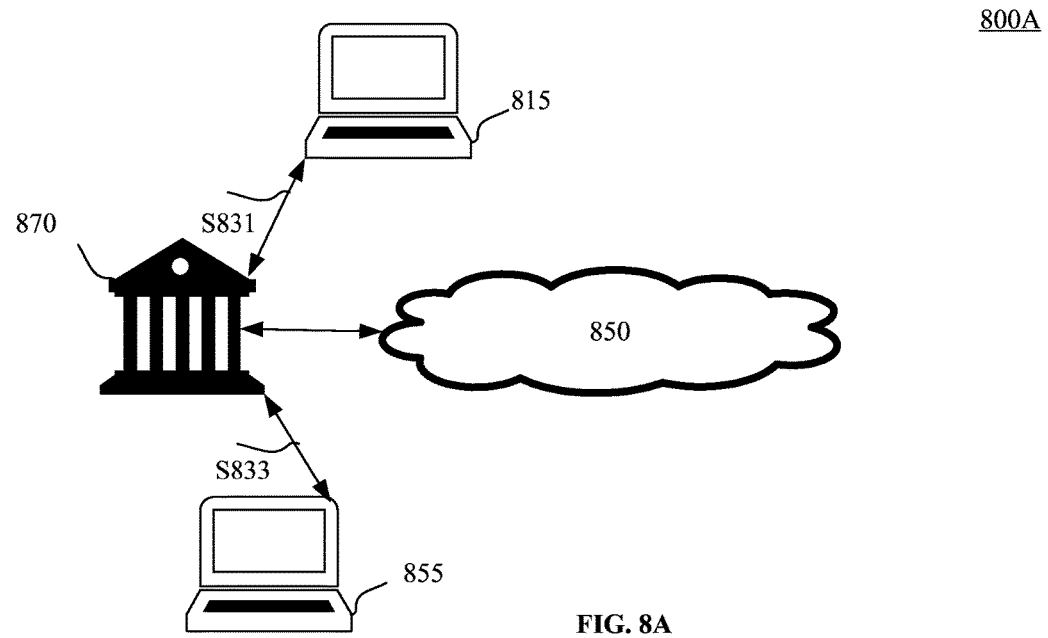
FIG. 8A illustrates another transaction network for blockchain-based transaction mechanisms, in accordance with a representative embodiment.

FIG. 8A illustrates another transaction network for blockchain-based transaction mechanisms, in accordance with a representative embodiment.

In FIG. 8A, the transaction network 800A includes a first user device 815 and a fifth user device 855 along with a trusted third-party financial institution 870 and a blockchain network 850. In the embodiment of FIG. 8A, at S831 the first user device 815 initiates an inquiry with the trusted third-party financial institution 870 to check on a blockchain transaction medium. For example, the first user device 815 may open an electronic wallet installed thereon to check a value of a blockchain transaction medium. The trusted third-party financial institution may verify the blockchain transaction medium with the blockchain network 850, and then identify a last transaction price for the class/subsets of blockchain transaction mediums that include the blockchain transaction medium being checked by the first user device 815.

At S833 the fifth user device 855 initiates an inquiry with the trusted third-party financial institution 870 to check on a blockchain transaction medium. For example, the fifth user device 855 may open an electronic wallet installed thereon to check a value of a blockchain transaction medium. The trusted third-party financial institution may verify the blockchain transaction medium with the blockchain network 850, and then identify a last transaction price for the class/subsets of blockchain transaction mediums that include the blockchain transaction medium being checked by the fifth user device 855.

In the embodiment of FIG. 8A and some other embodiments described herein, a blockchain transaction medium may have two or more values associated therewith. For example, a blockchain transaction medium may have a nominal value stated in units of the coin established by the protocol under which the blockchain transaction medium falls. The blockchain transaction medium may also have a general market value established for the general type of blockchain transaction mediums which include the blockchain transaction medium. The blockchain transaction medium may also have a special market value established for the subset of blockchain transaction mediums identified uniquely by the marks described herein. The unique markings may specifically identify the subset of blockchain transaction mediums as belonging to a subset that each correspond with a security that has rights to an income stream such as a royalty stream, a dividend stream, or an interest stream.

Figure 8B:
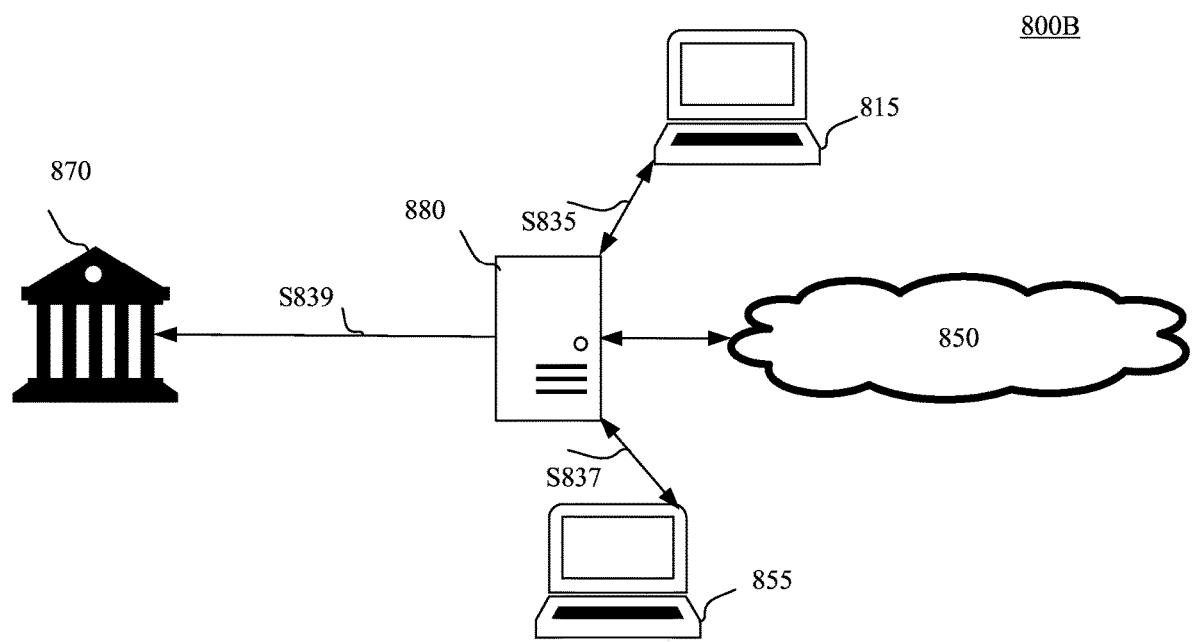
FIG. 8B illustrates another transaction network for blockchain-based transaction mechanisms, in accordance with a representative embodiment.

FIG. 8B illustrates another transaction network for blockchain-based transaction mechanisms, in accordance with a representative embodiment.

In FIG. 8B, the transaction network 800A includes a first user device 815 and a fifth user device 855 along with a trusted third-party intermediary service 880 and a trusted third-party financial institution 870 and a blockchain network 850. In the embodiment of FIG. 8B, at S831 the first user device 815 initiates an inquiry with the trusted third-party intermediary service 880, which in turn initiates an electronic communication exchange with the trusted third-party financial institution 870 to check on a blockchain transaction medium. For example, the first user device 815 may open an electronic wallet installed thereon to check a value of a blockchain transaction medium. The trusted third-party intermediary service 880 may verify the blockchain transaction medium with the blockchain network 850 and notify the trusted third-party financial institution 870 to identify a last transaction price for the class/subsets of blockchain transaction mediums that include the blockchain transaction medium being checked by the first user device 815.

At S833 the fifth user device 855 initiates an inquiry with the trusted third-party intermediary service 880, which in turn initiates an electronic communication exchange with the trusted third-party financial institution 870 to check on a blockchain transaction medium. For example, the fifth user device 855 may open an electronic wallet installed thereon to check a value of a blockchain transaction medium. The trusted third-party intermediary service 880 may verify the blockchain transaction medium with the blockchain network 850 and notify the trusted third-party financial institution 870 to identify a last transaction price for the class/subsets of blockchain transaction mediums that include the blockchain transaction medium being checked by the fifth user device 855.

In the embodiment of FIG. 8B and some other embodiments described herein, a blockchain transaction medium may have two or more values associated therewith. For example, a blockchain transaction medium may have a nominal value stated in units of the coin established by the protocol under which the blockchain transaction medium falls. The blockchain transaction medium may also have a general market value established for the general type of blockchain transaction mediums which include the blockchain transaction medium. The blockchain transaction medium may also have a special market value established for the subset of blockchain transaction mediums identified uniquely by the marks described herein. The unique markings may specifically identify the subset of blockchain transaction mediums as belonging to a subset that each correspond with a security that has rights to an income stream such as a royalty stream, a dividend stream, or an interest stream.

Figure 9:
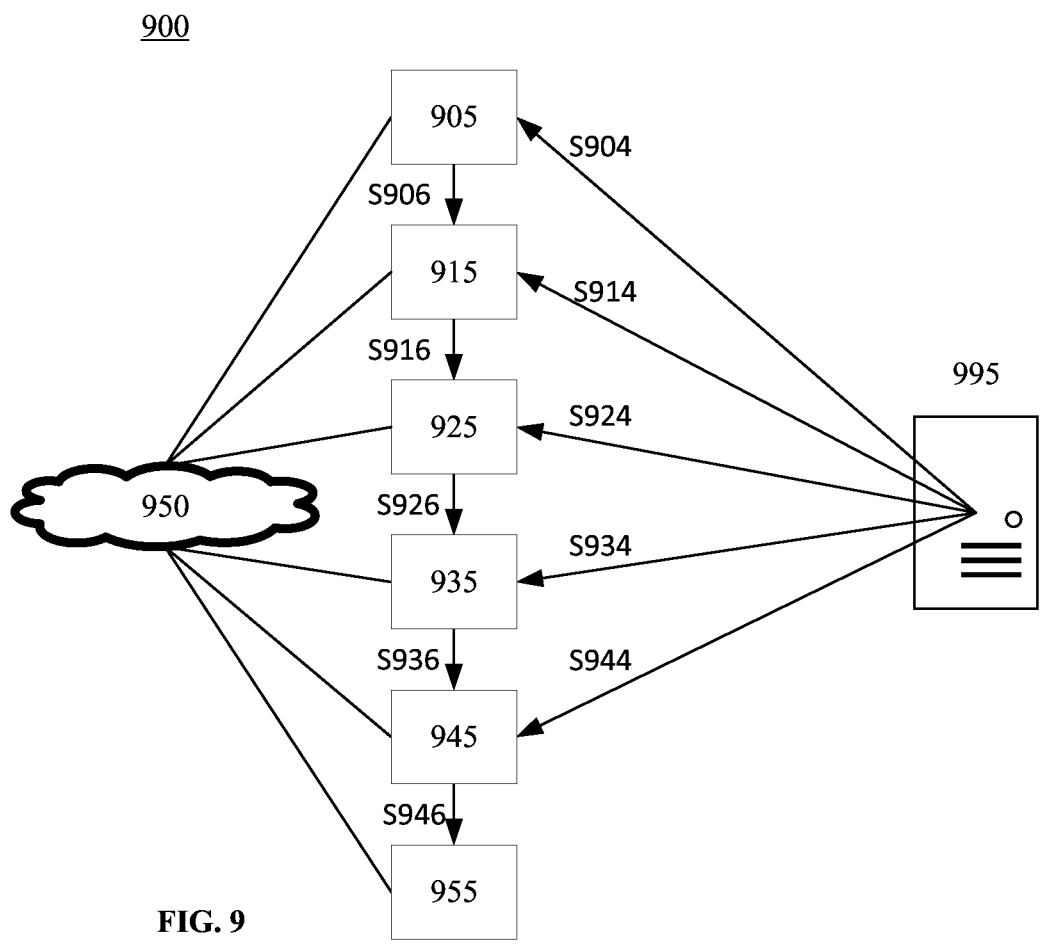
FIG. 9 illustrates another transaction network for blockchain-based transaction mechanisms, in accordance with a representative embodiment.

FIG. 9 illustrates another transaction network for blockchain-based transaction mechanisms, in accordance with a representative embodiment.

In FIG. 9, a transaction system 900 includes a blockchain network 950 and a set of user devices including a first user device 905, a second user device 915, a third user device 925, a fourth user device 935, a fifth user device 945 and a sixth user device 955. The set of user devices conduct transactions and generate records of the transactions that are then provided to the blockchain transaction nodes in the blockchain network 950 for recording in the versions of the blockchain maintained by the blockchain transaction nodes in the blockchain network 950. The set of user devices in FIG. 9 are controlled to synchronize the transactions by a central controller 995. For example, the central controller 995 may be a server that coordinates a sequence of transactions between the set of user devices.

In FIG. 9, the central controller 995 may send an instruction to the first user device 905 at S904. The first user device 905 then initiates and conducts a transaction with the second user device 915 at S906, based on the instruction at S904.

The central controller 995 may send an instruction to the second user device 915 at S914. The second user device 915 then initiates and conducts a transaction with the third user device 925 at S916, based on the instruction at S914.

The central controller 995 may send an instruction to the third user device 925 at S924. The third user device 925 then initiates and conducts a transaction with the fourth user device 935 at S926, based on the instruction at S924.

The central controller 995 may send an instruction to the fourth user device 935 at S934. The fourth user device 935 then initiates and conducts a transaction with the fifth user device 945 at S936, based on the instruction at S934.

The central controller 995 may send an instruction to the fifth user device 945 at S944. The fifth user device 945 then initiates and conducts a transaction with the sixth user device 955 at S946, based on the instruction at S944.

In the embodiment of FIG. 9, the central controller 995 operates centrally to coordinate user devices to conduct a sequence of transactions. The central controller 995 may include a memory that stores instructions and a processor that executes the instructions to implement the coordination. The coordination may be used to generate multiple sets of blockchain transaction mediums for different commitments. The sequence of transactions may be used to uniquely mark one or multiple sets of blockchain transaction mediums in order to dedicate the set of blockchain transaction mediums to a common commitment. In an embodiment, each set of blockchain transaction mediums can be issued to personnel included in different contributor nodes of an entity such as a business. The blockchain transaction mediums can be used as the basis for receiving royalties due to the personnel of the contributor node of the entity. The blockchain transaction mediums can also be transacted on electronic exchanges based on the mechanisms described herein.

FIG. 10A illustrates an arrangement for transaction reporting for blockchain-based transaction mechanisms, in accordance with a representative embodiment.

In FIG. 10A, a transaction system 1000A includes a blockchain transaction network 1050 and a set of user devices including a first user device 1005, a second user device 1015, a third user device 1025, a fourth user device 1035, a fifth user device 1045 and a sixth user device 1055. The set of user devices in FIG. 10A conduct transactions and generate records of the transactions that are then reported to the reporting authority 1070 while also being reported to and recorded in the newest blocks maintained by the blockchain transaction nodes in the blockchain transaction network 1050. The set of user devices in FIG. 10 report to the reporting authority 1070 when they are sending the blockchain transaction medium(s) to the recipient.

For example, the first user device 1005 sends a blockchain transaction medium to the second user device 1015 at S1006, and then notifies the reporting authority of the transaction at 1007. The second user device 1015 sends the blockchain transaction medium to the third user device 1025 at S1016, and then notifies the reporting authority of the transaction at 1017. The third user device 1025 sends the blockchain transaction medium to the fourth user device 1035 at S1026, and then notifies the reporting authority of the transaction at 1027. The fourth user device 1035 sends the blockchain transaction medium to the fifth user device 1045 at S1036, and then notifies the reporting authority of the transaction at 1037. The fifth user device 1045 sends the blockchain transaction medium to the sixth user device 1055 at S1046, and then notifies the reporting authority of the transaction at 1047.

In the embodiment of FIG. 10A, the reporting authority 1070 may track the blockchain transaction mediums to ensure the current owners are credited with royalty payments or other income payments (e.g., dividends, interest) due to owners of securities corresponding to the blockchain transaction mediums. The sending user devices may know to report the transactions to the reporting authority 1070 due to operating instructions in electronic wallets stored in and executed by the sending user devices. The sending user devices may also or alternatively know to report the transactions to the reporting authority 1070 due to operating instructions provided in, on or with the blockchain transaction medium. For example, an executable instruction provided with each blockchain transaction medium may specify that the reporting authority 1070 is to be notified of each transaction, including date, time, sender, recipient, and so on. The executable instruction may be provided in an executable portion of the blockchain transaction medium, or in an executable section of a packet by which the blockchain transaction medium is transmitted. Electronic wallets executed by the sending user devices may be configured to implement the reporting to the reporting authority 1070, even when other blockchain transaction mediums of the same type do not always have the same requirements.

In accordance with some embodiments consistent with the description of FIG. 10A, a method for dedicating a set of blockchain transaction mediums may include notifying the issuer of each blockchain transaction medium of each transaction involving the blockchain transaction medium. For example, blockchain transaction mediums may include executable instructions to perform such notifications. Alternatively, electronic wallets may be configured with executable instructions to recognize such blockchain transaction mediums and send a notification to a predetermined communications address of the issuer. In other alternatives, the executable instructions to perform the notifications may accompany the blockchain transaction mediums without being part of the blockchain transaction mediums.

FIG. 10B illustrates another arrangement for transaction reporting for blockchain-based transaction mechanisms, in accordance with a representative embodiment.

In FIG. 10B, a transaction system 1000B again includes a blockchain transaction network 1050 and a set of user devices including a first user device 1005, a second user device 1015, a third user device 1025, a fourth user device 1035, a fifth user device 1045 and a sixth user device 1055. The set of user devices conduct transactions and generate records of the transactions that are then reported to the reporting authority 1070 while also being reported to and recorded in the newest blocks maintained by the blockchain transaction nodes in the blockchain transaction network 1050. The set of user devices in FIG. 10 report to the reporting authority 1070 when they are receiving the blockchain transaction medium(s) from the sender.

For example, the first user device 1005 sends a blockchain transaction medium to the second user device 1015 at S1006, which then notifies the reporting authority of the transaction at S1014. The second user device 1015 sends the blockchain transaction medium to the third user device 1025 at S1016, which then notifies the reporting authority of the transaction at S1024. The third user device 1025 sends the blockchain transaction medium to the fourth user device 1035 at S1026, which then notifies the reporting authority of the transaction at S1034. The fourth user device 1035 sends the blockchain transaction medium to the fifth user device 1045 at S1036, which then notifies the reporting authority of the transaction at S1044. The fifth user device 1045 sends the blockchain transaction medium to the sixth user device 1055 at S1046, which then notifies the reporting authority of the transaction at S1054.

In the embodiment of FIG. 10B, the reporting authority 1070 may track the blockchain transaction mediums to ensure the current owners are credited with royalty payments or other income payments (e.g., dividends, interest) due to owners of securities corresponding to the blockchain transaction mediums. The receiving user devices may know to report the transactions to the reporting authority 1070 due to operating instructions in electronic wallets stored in and executed by the receiving user devices. The receiving user devices may also or alternatively know to report the transactions to the reporting authority 1070 due to operating instructions provided in, on or with the blockchain transaction medium. For example, an executable instruction provided with each blockchain transaction medium may specify that the reporting authority 1070 is to be notified of each transaction, including date, time, sender, recipient, and so on. The executable instruction may be provided in an executable portion of the blockchain transaction medium, or in an executable section of a packet by which the blockchain transaction medium is transmitted. Electronic wallets executed by the receiving user devices may be configured to implement the reporting to the reporting authority 1070, even when other blockchain transaction mediums of the same type do not always have the same requirements.

FIG. 10C illustrates another arrangement for transaction reporting for blockchain-based transaction mechanisms, in accordance with a representative embodiment.

In the embodiment of FIG. 10, a transaction system 1000C includes at least the reporting authority 1070 and the blockchain transaction network 1050. In this embodiment, the blockchain transaction network 1050 notifies the reporting authority 1070 of each transaction. For example, a blockchain transaction node in the blockchain transaction network 1050 that is first notified of any transaction involving the set of blockchain transaction mediums may be required to notify the reporting authority 1070 of the transaction before or when notifying other blockchain transaction nodes in the blockchain transaction network 1050 of the transaction.

FIG. 11 illustrates a method for tracking blockchain-based transaction mechanisms, in accordance with a representative embodiment.

In FIG. 11, the process starts at S1110 by completing a transaction.

At S1120, notification of transaction completion is sent.

At S1130, the presence of unique markings of the blockchain transaction mediums may be confirmed.

At S1140, identification of recipients of blockchain transaction medium(s) as new holders is confirmed.

At S1150, records are updated to reflect the completed transaction.

At S1160, royalties are received and distributed to or on behalf of the blockchain transaction medium(s).

FIG. 12 illustrates a wallet user interface for blockchain-based transaction mechanisms, in accordance with a representative embodiment.

In the embodiment of FIG. 12, a display 2053 may be a display on a first user device 205 described earlier. The display 2053 may be configured to display a wallet user interface. The wallet user interface may be an interactive user interface that shows information of an electronic wallet user interface, including details of blockchain mediums owned by the owner or the user of the first user device 205.

As shown in FIG. 12, a blockchain medium #1 may have a nominal value X1, such as 1 coin unit or 5 coin units of a cryptocurrency. The blockchain medium #1 may also have a default market value Y1, such as a market value of the nominal value X1 expressed in another currency such as dollars or pesos, based on a most recent market exchange between the cryptocurrency and the other currency. The blockchain medium #1 may also have a subclass market value Z1, which is specific only to the blockchain transaction mediums uniquely marked in the manner described herein. The default market value Y1 may operate as a variable floor for values of the blockchain medium #1, whereas the subclass market value Z1 may be higher than the default market value Y1 when the securities corresponding to the set of blockchain transaction mediums with the unique markings are expected to receive, or actually receive, income such as royalties, dividends or interest.

Also in FIG. 12, a blockchain medium #2 may have a nominal value X2. The blockchain medium #2 may also have a default market value Y2 and a subclass market value Z2. The blockchain medium #2 may be a token derived from a different type of cryptocurrency than the blockchain medium #1. The blockchain medium #2 may also correspond to a different set of securities than the blockchain medium #1. An electronic wallet implemented by the first user device 205 may be configured to provision blockchain transaction mediums of multiple different types and for multiple different purposes.

Figure 13:
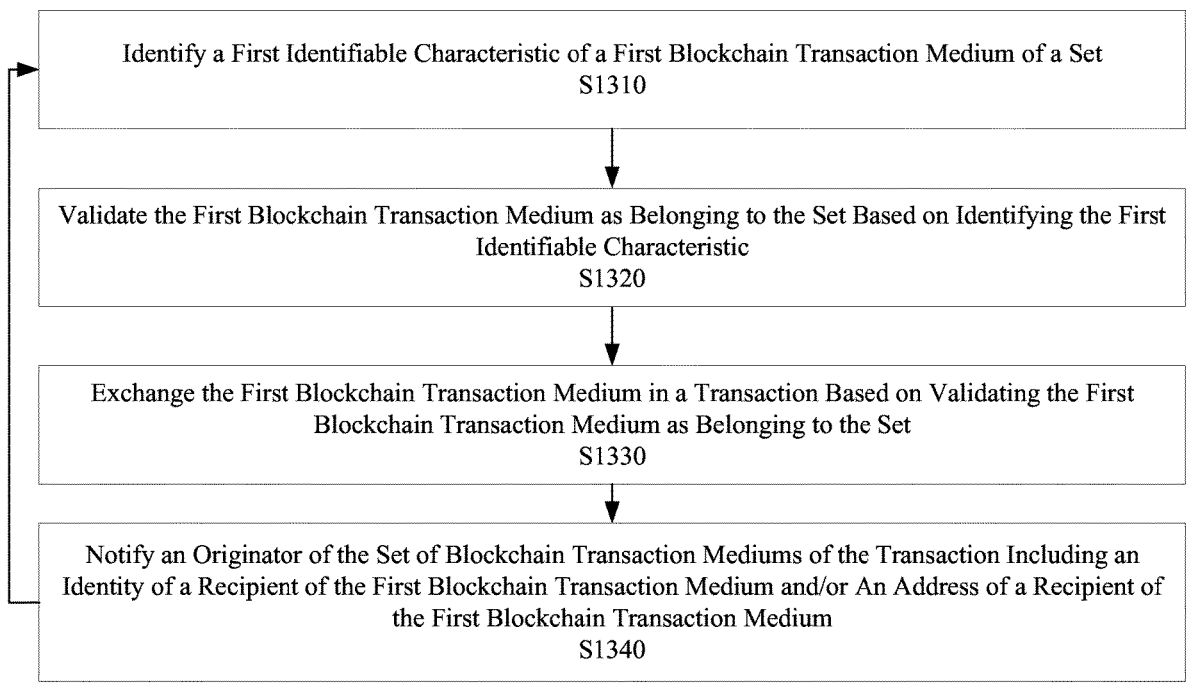
FIG. 13 illustrates a method for transacting a set of blockchain transaction mediums dedicated to a common commitment, in accordance with a representative embodiment.

FIG. 13 illustrates a method for transacting a set of blockchain transaction mediums dedicated to a common commitment, in accordance with a representative embodiment.

The process of FIG. 13 starts at S1310 by identifying a first identifiable characteristic of a first blockchain transaction medium of a set.

At S1320, the process of FIG. 13 includes validating the first blockchain transaction medium as belonging to the set based on identifying the first identifiable characteristic at S1310.

At S1330, the process of FIG. 13 includes exchanging the first blockchain transaction medium in a transaction based on validating the first blockchain transaction medium as belonging to the set at S1340. For example, the exchanging may be conducted between two electronic wallets stored on two separate computers controlled by two separate users. The exchanging may be performed by an electronic exchange, such as an electronic exchange implemented by a third-party server that communicates with the computers that store and execute the electronic wallets.

At S1340, the process of FIG. 13 includes notifying an originator of the set of blockchain transaction mediums of the transaction including an identity of a recipient of the first blockchain transaction medium and/or an address of a recipient of the first blockchain transaction medium. For example, the originator may be notified by an electronic message to a predetermined electronic communications address.

After S1340, the process returns to S1310 to identify a first identifiable characteristic of another blockchain transaction medium of the set. The process of FIG. 13 may be performed each time a blockchain transaction medium is received in order to check whether the blockchain transaction medium belongs to a particular set of blockchain transaction mediums. Numerous different sets of blockchain transaction mediums may be identified using the process of FIG. 13.

Figure 14:
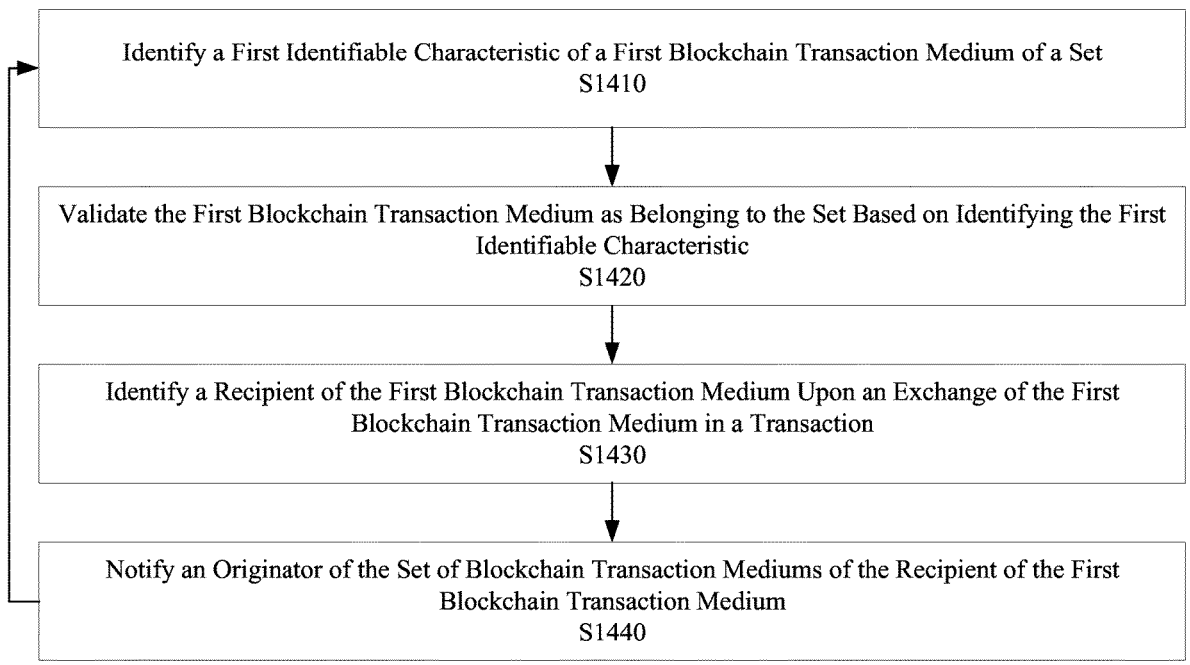
FIG. 14 illustrates a method for tracking ownership of a set of blockchain transaction mediums dedicated to a common commitment, in accordance with a representative embodiment.

FIG. 14 illustrates a method for tracking ownership of a set of blockchain transaction mediums dedicated to a common commitment, in accordance with a representative embodiment.

The process of FIG. 14 begins at S1410 with identifying a first identifiable characteristic of a first blockchain transaction medium of a set.

At S1420, the process of FIG. 14 includes validating the first blockchain transaction medium as belonging to the set based on identifying the first identifiable characteristic.

At S1430, the process of FIG. 14 includes identifying a recipient of the first blockchain transaction medium upon an exchange of the first blockchain transaction medium in a transaction. For example, the recipient may be identified based on an instruction provided with the first blockchain transaction medium in the transaction. Alternatively, the recipient may be identified based on an instruction in the first blockchain transaction medium. The recipient may alternatively be identified based on an instruction in the first blockchain transaction medium.

At S1440, the process of FIG. 14 includes notifying an originator of the set of blockchain transaction mediums of the recipient of the first blockchain transaction medium. For example, the originator may be notified by an electronic message to a predetermined electronic communications address that is provided with the instruction(s) to identify the recipient at S1430.

FIG. 15 illustrates a wallet user interface displaying transaction records for blockchain-based transaction mechanisms, in accordance with a representative embodiment.

As shown, the display 2053 shows a display labelled "Transactions". The fields for the transactions shown in FIG. 15 include Transaction ID, TimeStamp, Sender, Recipient, Type, Pool Value and Set Value.

The Transaction ID shown in the display 2053 of FIG. 15 may be a numeric identification, an alphabetic identification, or a combined alphanumeric identification specific to a transaction involving a blockchain transaction medium. The Transaction ID may also include an identification specific to the blockchain transaction medium, such as an identification number within a numbering system for the set of blockchain transaction mediums created for a particular common commitment.

The TimeStamp shown in the display 2053 of FIG. 15 may include a time and date of the transaction and may appear as one set of information for the time and another set of information for the date.

The Sender shown in the display 2053 of FIG. 15 may include a communications address of a sender, an identification of the sender, and/or any other information that may be used to identify and/or communicate with the sender. For example, an identification of the sender may be a user identification unique within user identifications for a system that provides wallets as described herein. An identification of the sender may also be an identification such as a name, social security number, drivers license number, of other identification specific to a particular sender in a transaction.

The Recipient shown in the display 2053 of FIG. 15 may include a communications address of a recipient, an identification of the recipient, and/or any other information that may be used to identify and/or communicate with the recipient. For example, an identification of the recipient may be a user identification unique within user identifications for a system that provides wallets as described herein. An identification of the recipient may also be an identification such as a name, social security number, drivers license number, of other identification specific to a particular recipient in a transaction.

The Type shown in the display 2053 of FIG. 15 may specify a type of the underlying blockchain transaction protocol for the blockchain transaction medium used in the transaction. For example, a Type may specify Bitcoin, Ethereum, or another type specific to a type of blockchain transaction mediums.

The Pool Value shown in the display 2053 of FIG. 15 may be the default value for the most recent reported transactions involving the Type of blockchain transaction medium and may be the unit value of such blockchain transaction mediums expressed in dollars or another currency.

The Set Value shown in the display 2053 of FIG. 15 may be the value particular to the set that includes the blockchain transaction medium in any particular transaction shown in the display 2053 of FIG. 15. For example, each different set of dedicated blockchain transaction mediums created among a larger pool of blockchain transaction mediums may be identified with a particular set identification, and transactions involving blockchain transaction mediums in the set may involve valuations that float away from the default values for the larger pool.

Figure 16:
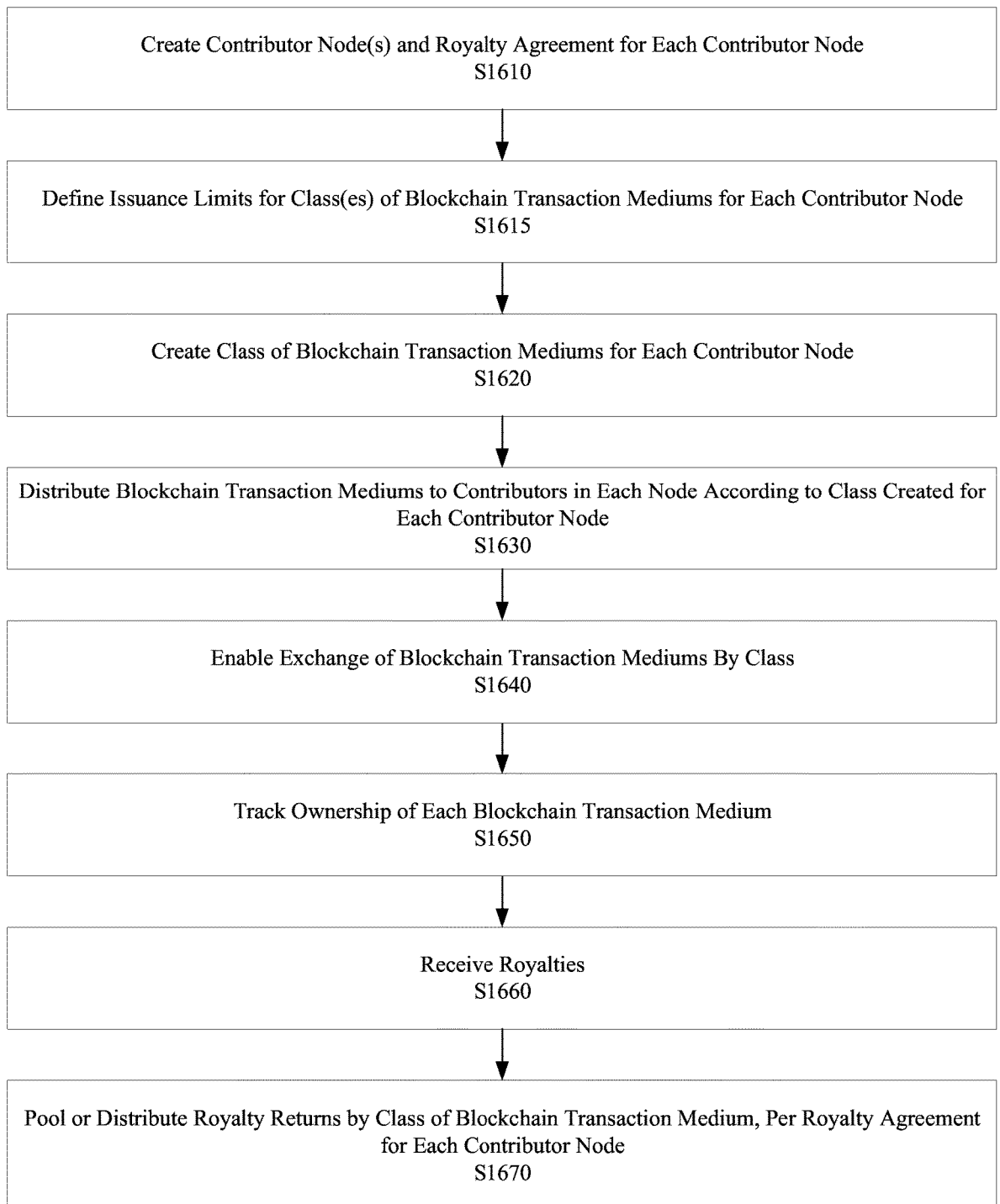
FIG. 16 illustrates another process flow for blockchain-based transaction mechanisms, in accordance with another representative embodiment.

FIG. 16 illustrates another process flow for blockchain-based transaction mechanisms, in accordance with another representative embodiment.

In FIG. 16, the process starts at S1610 with creating one or more contributor node(s) and a royalty agreement for each contributor node.

At S1615, the process includes defining issuance limits for blockchain transaction mediums for each contributor node created at S1610.

At S1620, the process includes creating a class of blockchain transaction mediums for each contributor node created at S1610.

At S1630, the process includes distributing blockchain transaction mediums to contributors in each contributor node according to the class of blockchain transaction mediums created for each contributor node.

At S1640, the process includes enabling exchanges of blockchain transaction mediums by class.

At S1650, the process includes tracking ownership of each blockchain transaction medium as the blockchain transaction mediums are exchanged.

At S1660, royalties are received.

At S1670, the process includes pooling or distributing royalty returns by class of blockchain transaction medium, per the royalty agreement for each contributor node.

In accordance with some embodiments consistent with the description of FIG. 16, a method for distributing royalties for a set of blockchain transaction mediums dedicated to a common commitment may include receiving notification of a royalty due to holders of the set of blockchain transaction mediums. The method may also include obtaining updated identifications of current owners of each of the set of blockchain transaction mediums and distributing the royalty to or on behalf of the current owners of the set of blockchain transaction mediums. For example, the royalty may be distributed to a pool held on behalf of the owners of the set of blockchain transaction mediums. The royalty may be distributed to electronic accounts of each of the owners of the set of blockchain transaction mediums. As explained already, valuations of the set of blockchain transaction mediums may float on the free market based on the royalties due to the set of blockchain transaction mediums and may be allowed to diverge from valuations of other blockchain transaction mediums of the same type as the set of blockchain transaction mediums.

In accordance with some embodiments consistent with the description of FIG. 16, a method for distributing royalties for a set of blockchain transaction mediums may include updating an electronic wallet that holds at least one of the set of blockchain transaction mediums to reflect pricing of the set of blockchain transaction mediums based on a last-reported transaction in which another of the set of blockchain transaction mediums was exchanged. For example, when the blockchain transaction mediums in a specific set are transacted in an electronic exchange, the pricing for the transaction may be reported so that electronic wallets that hold or otherwise control other blockchain transaction mediums of the set can obtain updated pricing.

Figure 17:
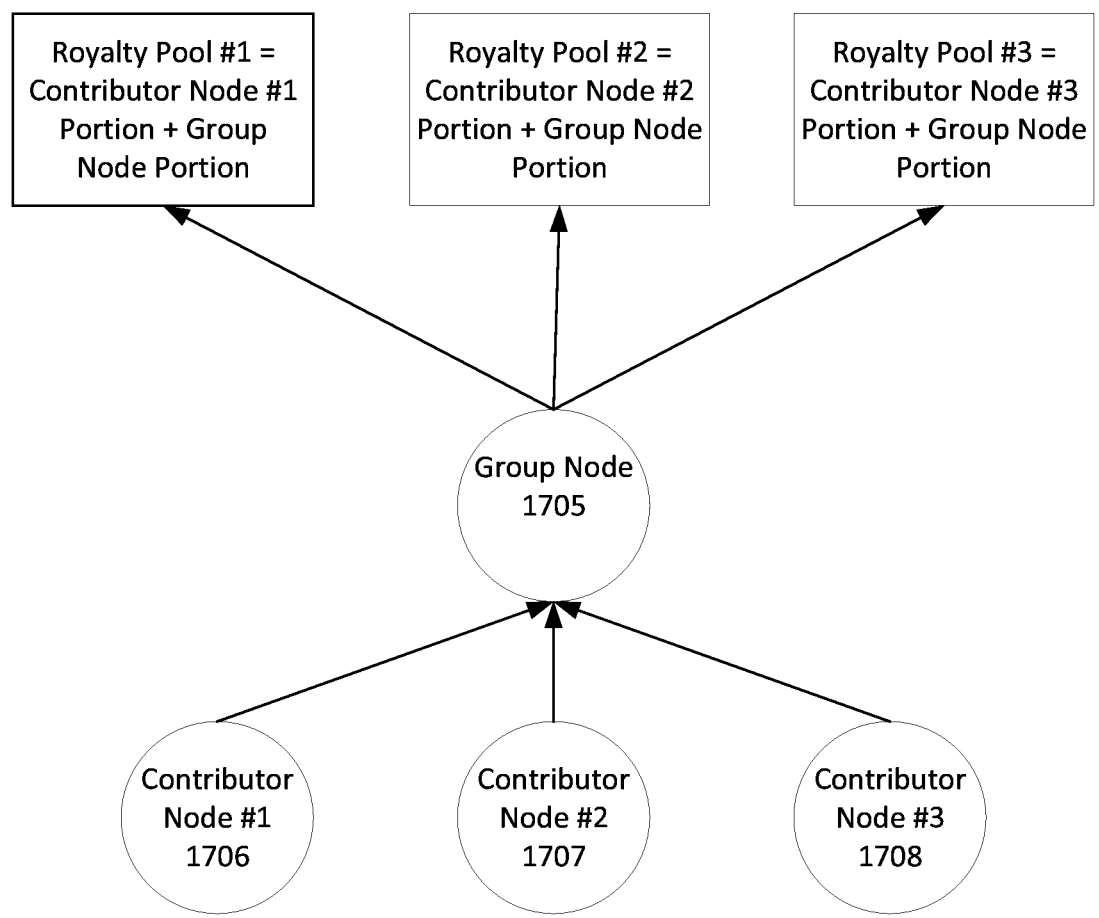
FIG. 17 illustrates a royalty arrangement for blockchain-based transaction mechanisms, in accordance with another representative embodiment.

FIG. 17 illustrates a royalty arrangement for blockchain-based transaction mechanisms, in accordance with another representative embodiment.

In FIG. 17, a first contributor node #1 1706 generates first royalties, a second contributor node #2 1707 generates second royalties, and a third contributor node #3 1708 generates third royalties. The first contributor node #1 1706 is designated to receive a portion of the royalties it generates, the second contributor node #2 1707 is designated to receive a portion of the royalties it generates, and the third contributor node #3 1708 is designated to receive a portion of the royalties it generates. A group node 1705 does not itself generate royalties but is also designated to receive a portion of royalties generated by the first contributor node #1 1706, the second contributor node #2 1707, and the third contributor node #3 1708. According to the royalty arrangement of FIG. 17, a first royalty pool #1 for the contributor node #1 1706 includes the contributor node #1 portion plus a group node portion. The second royalty pool #2 for the contributor node #2 1707 includes the contributor node #2 portion plus a group node portion. The third royalty pool #3 for the contributor node #3 1708 includes the contributor node #3 portion plus a group node portion. Accordingly, even if one of the first contributor node #1 1706, the second contributor node #2 1707 and the third contributor node #3 1708 does not generate royalties, the contributors to any such contributor node will still be entitled to a portion of royalties distributed from the group node 1705.

Figure 18:
FIG. 18 illustrates a hybrid token pool and timeline for the token pool for blockchain-based transaction mechanisms, in accordance with another representative embodiment.

FIG. 18 illustrates a hybrid token pool and timeline for the token pool for blockchain-based transaction mechanisms, in accordance with another representative embodiment.

In FIG. 18, a predefined token pool 2105 includes tokens from token #1 1811 to token #X 181x. The predefined token pool 1805 is created for one of the contributor nodes in FIG. 17. The tokens are distributed either all at once at T1, or according to a preset arrangement at different times including T1, T2 and perhaps other times. At T3, royalties are received for the corresponding contributor node, and distributed according to the preset arrangement. The royalties may be allocated for each token in the predefined token pool 1805 or may be limited to tokens distributed already from the predefined token pool 1805 at the time the royalties are received.

Alternatively, in the embodiment of FIG. 18, the royalties may be received at T3 but retained in an account assigned to the owners of tokens in the predefined token pool 1805. When the tokens of the predefined token pool 1805 are exchangeable in transactions, the value of the tokens of the predefined token pool 1805 may vary based on the expectations of the amount of royalties to be allocated for the tokens of the predefined token pool 1805. As explained for earlier embodiments, the tokens of a predefined token pool 1805 may also have a base value that varies for a larger group of tokens from which the tokens of the predefined token pool 1805 are created.

Accordingly, blockchain-based transaction mechanisms enable automated repurposing of digital currencies of various types to mark and use for specific purposes such as for transaction mediums to which royalties may be allocated. The marking may be provided in various ways including through use of blockchain mechanisms, though blockchain-based transaction mechanisms as described herein are not limited to blockchains or blockchain-based digital currencies.

Although blockchain-based transaction mechanisms have been described with reference to several exemplary embodiments, it is understood that the words that have been used are words of description and illustration, rather than words of limitation. Changes may be made within the purview of the appended claims, as presently stated and as amended, without departing from the scope and spirit of blockchain-based transaction mechanisms in its aspects. Although blockchain-based transaction mechanisms has been described with reference to particular means, materials and embodiments, blockchain-based transaction mechanisms is not intended to be limited to the particulars disclosed; rather blockchain-based transaction mechanisms extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A method for dedicating a set of digital tokens of a single type to a use, the method comprising:
   obtaining a set of digital tokens of the single type at a first networked transaction node from a pool of digital tokens of the single type that includes the set of digital tokens of the single type; and individually, separately and uniquely marking a record for each of the set of digital tokens of the single type with a first identifiable characteristic dedicated only to the set of digital tokens of the single type by adding data with the first identifiable characteristic and limited only to the set of digital tokens of the single type to the record for each of the set of digital tokens of the single type, wherein the set of digital tokens of the single type are exchangeable in transactions at a first value common to the pool of digital tokens of the single type, and at a second value common only to the set of digital tokens of the single type.

2. The method of claim 1, further comprising:
storing the record marked with the first identifiable characteristic for each of the set of digital tokens of the single type in a blockchain.

3. The method of claim 1, further comprising:
issuing the pool of digital tokens; and
receiving notifications of transactions involving digital tokens from the pool of digital tokens over an electronic communications network.

4. The method of claim 1, wherein the first identifiable characteristic is based on at least one of an identification of a specific computer, or sequential movement of the set of digital tokens of the single type from a first networked transaction node which includes the specific computer to a second networked transaction node.

5. The method of claim 1, wherein the first identifiable characteristic is based on at least one of a specific date or a specific time that the set of digital tokens of the single type are held at a networked transaction node.

6. The method of claim 1, wherein rights to receive payments are correlated with the set of digital tokens of the single type.

7. The method of claim 1, wherein the first identifiable characteristic uniquely marks the record for each of the set of digital tokens of the single type distinguishable from any and all other digital tokens of the single type.

8. The method of claim 1, wherein each of the set of digital tokens of the single type is transacted at least one time prior to being obtained at the first networked transaction node and prior to the record for each of the set of digital tokens being individually, separately and uniquely marked.

9. A method for dedicating sets of digital tokens of a single type to uses, the method comprising:
assigning to a first use a first set of digital tokens of a single type from a pool of digital tokens of the single type that includes the first set of digital tokens of the single type, a second set of digital tokens of the single type and other digital tokens of the single type;
dedicating the first set of digital tokens of the single type to the first use;
assigning to a second use the second set of digital tokens of the single type from the pool of digital tokens of the single type; and
dedicating the second set of digital tokens of the single type to the second use, wherein the first set of digital tokens of the single type are exchangeable in transactions at a first value common to the pool of digital tokens of the single type, and at a second value common only to the first set of digital tokens of the single type, and wherein the second set of digital tokens of the single type are exchangeable in transactions at the first value common to the pool of digital tokens of the single type, and at a third value common only to the second set of digital tokens of the single type.

10. The method of claim 9, further comprising:
issuing notification of a royalty due to holders of the first set of digital tokens of the single type;
obtaining updated identifications of current owners of each of the first set of digital tokens of the single type; and
distributing the royalty to or on behalf of the current owners of the first set of digital tokens of the single type.

11. The method of claim 10, further comprising:
distributing the royalty to a pool held on behalf of the current owners of the first set of digital tokens of the single type.

12. The method of claim 10, further comprising:
distributing the royalty to electronic accounts of each of the current owners of the first set of digital tokens of the single type.

13. The method of claim 10, wherein valuations of the first set of digital tokens of the single type float based on royalties due to the first set of digital tokens of the single type and are allowed to diverge from valuations of other digital tokens of the single type.

14. The method of claim 10, further comprising:
individually, separately and uniquely marking a record for each of the first set of digital tokens of the single type with a first identifiable characteristic dedicated only to the first set of digital tokens of the single type by adding data with the first identifiable characteristic and limited only to the first set of digital tokens of the single type to the record for each of the first set of digital tokens of the single type.

15. The method of claim 14, further comprising:
individually, separately and uniquely marking a record for each of the second set of digital tokens of the single type with a second identifiable characteristic dedicated only to the second set of digital tokens of the single type by adding data with the second identifiable characteristic and limited only to the second set of digital tokens of the single type to the record for each of the second set of digital tokens of the single type.

16. The method of claim 15, further comprising:
recording the record for each of the first set of digital tokens in a blockchain with the first identifiable characteristic, and
recording the record for each of the second set of digital tokens in the blockchain with the second identifiable characteristic.

17. The method of claim 14, wherein each of the first set of digital tokens of the single type is transacted at least one time prior to being assigned to the first use, and wherein each of the second set of digital tokens is transacted at least one time prior to being assigned to the second use; and
wherein each of the first set of digital tokens is transacted at least one time prior to the record for each of the first set of digital tokens being individually, separately and uniquely marked, and wherein each of the second set of digital tokens is transacted at least one time prior to the record for each of the second set of digital tokens being individually, separately and uniquely marked.

18. A method for transacting a set of digital tokens of a single type dedicated to a use from a pool of digital tokens of the single type that includes the set of digital tokens of the single type, the method comprising:
identifying an identifiable characteristic in a record for a digital token of the set of digital tokens;

validating the digital token as belonging to the set of digital tokens based on identifying the identifiable characteristic in the record for the digital token of the set of digital tokens; and exchanging the digital token in a transaction based on validating the digital token as belonging to the set based on identifying the identifiable characteristic in the record for the digital token of the set, wherein the set of digital tokens of the single type are exchangeable in transactions at a first value common to the pool of digital tokens of the single type, and at a second value common only to the set of digital tokens of the single type.

19. The method of claim 18, wherein the identifiable characteristic uniquely marks the set of digital tokens of the single type distinguishable from any and all other digital tokens of the single type.

20. The method of claim 18, wherein the validating comprises retrieving the record for the digital token with the identifiable characteristic for the set of digital tokens of the single type from a blockchain.

* * * * *